(12) United States Patent
Adusumilli

(10) Patent No.: US 8,601,566 B2
(45) Date of Patent: Dec. 3, 2013

(54) MECHANISM SUPPORTING WIRED AND WIRELESS METHODS FOR CLIENT AND SERVER SIDE AUTHENTICATION

(75) Inventor: Koteshwerrao Adusumilli, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1376 days.

(21) Appl. No.: 10/045,893

(22) Filed: Jan. 12, 2002

(65) Prior Publication Data

US 2003/0097592 A1 May 22, 2003

Related U.S. Application Data

(63) Continuation-in-part of application No. 10/000,154, filed on Oct. 23, 2001.

(51) Int. Cl.
*G06F 9/00* (2006.01)
(52) U.S. Cl.
USPC .............................. 726/12; 380/270; 709/230
(58) Field of Classification Search
USPC .......................... 713/201, 153; 726/12, 11, 14
See application file for complete search history.

(56) References Cited

U.S. PATENT DOCUMENTS

| | | | | |
|---|---|---|---|---|
| 5,699,431 | A * | 12/1997 | Van Oorschot et al. | 380/30 |
| 5,982,898 | A | 11/1999 | Hsu et al. | |
| 6,092,202 | A | 7/2000 | Veil et al. | |
| 6,125,349 | A * | 9/2000 | Maher | 705/1 |
| 6,216,231 | B1 * | 4/2001 | Stubblebine | 726/10 |
| 6,230,269 | B1 | 5/2001 | Spies et al. | |
| 6,289,460 | B1 * | 9/2001 | Hajmiragha | 726/28 |
| 6,308,277 | B1 | 10/2001 | Vaeth et al. | |
| 6,367,009 | B1 * | 4/2002 | Davis et al. | 713/166 |
| 6,473,406 | B1 * | 10/2002 | Coile et al. | 370/248 |
| 6,571,221 | B1 * | 5/2003 | Stewart et al. | 705/52 |
| 6,690,304 | B1 | 2/2004 | Shirokura et al. | |

(Continued)

FOREIGN PATENT DOCUMENTS

| EP | 1083722 | 3/2001 |
|---|---|---|
| EP | 1083722 | 5/2001 |

(Continued)

OTHER PUBLICATIONS

Stephen Cobb, The flip side of the wireless explosion: Dealing with WAP-gap security risks. Webpage [online]. Serverworld: Sun Server Archives: Jan. 2001 Issue. [retrieved on Sep. 11, 2001] Retrieved on the Internet: <URL:http://www.serverworldmagazine.com/sunserver/2001/01/wapgap.shtml. pp. 1-4.

(Continued)

*Primary Examiner* — Christopher Brown
(74) *Attorney, Agent, or Firm* — Blakely, Sokoloff, Taylor & Zafman LLP

(57) ABSTRACT

Authentication functions are centralized in a security system to offload servers of this functionality, and to provide an end-to-end solution for secure internet transactions. The security system supports authentication functions for authenticating a server by requesting server certificates from a certificate authority, and sending server certificates to clients requesting authentication. The security system also authenticates clients by checking digital signatures, validating the client certificates, which includes checking CA signatures, checking the validity period of the signatures, maintaining a certificate revocation list (CRL), and checking client certificates against the CRL.

3 Claims, 24 Drawing Sheets

(56) References Cited

U.S. PATENT DOCUMENTS

| | | | |
|---|---|---|---|
| 6,751,221 B1 | 6/2004 | Saito et al. | |
| 6,931,526 B1* | 8/2005 | Bacha et al. | 713/151 |
| 7,055,171 B1 | 5/2006 | Martin et al. | |
| 7,099,284 B2* | 8/2006 | Halme | 370/253 |
| 7,237,261 B1 | 6/2007 | Huber et al. | |
| 2001/0001234 A1 | 5/2001 | Addy | |
| 2002/0019223 A1 | 2/2002 | Lee et al. | |
| 2002/0099957 A1* | 7/2002 | Kramer et al. | 713/201 |
| 2002/0133598 A1* | 9/2002 | Strahm et al. | 709/228 |
| 2002/0146129 A1 | 10/2002 | Kaplan | |
| 2002/0178365 A1 | 11/2002 | Yamaguchi | |
| 2003/0046532 A1* | 3/2003 | Gast | 713/151 |
| 2003/0050896 A1 | 3/2003 | Wiederin | |
| 2004/0010684 A1* | 1/2004 | Douglas | 713/168 |

FOREIGN PATENT DOCUMENTS

| | | |
|---|---|---|
| GB | 2 395 877 | 6/2004 |
| TW | 448658 | 8/2001 |
| TW | 463510 | 11/2001 |
| WO | WO-0028752 | 5/2000 |
| WO | WO-0041364 | 7/2000 |
| WO | WO 03/036913 A2 | 5/2003 |
| WO | WO 03/061246 A1 | 7/2003 |

OTHER PUBLICATIONS

Security in the WTLS. Whitepaper [online]. Oct. 1, 2000 Sami Jormalainen and Jouni Laine. [retrieved Sep. 11, 2001] Retrieved from the Internet: <URL:http://www.hut.fi/~jtlaine2/wtls/. pp. 1-21.
User Guide; Intel® NetStructure™ 7110/7115 e-Commerce Accelerator. Version 2.3; Jul. 28, 2000. Chapters 1-9 and Appendices A-C. pp. 1-166.
Intel® NetStructure™ 7175 Traffic Director. E-Business traffic management that reduces errors. Product Data Sheet. pp. 1-2.
Intel® NetStructure™ 7280 XML Director. Intelligent management and reliability for key XML transactions. Reseller Sales Brief: What You Need to Know About the Intel® NetStructure™ 7280 XML Director. Product Data Sheet. pp. 1-2.
Intel® NetStructure™ 7140 Traffic Director. High performance, intelligent traffic management. Product Data Sheet. pp. 1-2.
Intel NetStructure: Accelerating Internet Commerce. Product Data Sheet. A Standish Group Research Note Copyright © 2000. pp. 1-4.
Designing a Secured Website. What you need to know about SSL Benchmarking. Intel®. Whitepaper. pp. 1-23.
Wireless Transport Layer Security; Version Apr. 6, 2001. Wireless Application Protocol; WAP-261-WTLS-20010406-a. pp. 1-106.
WAP Transport Layer End-to-end Security. Approved Version Jun. 28, 2001. Wireless Application Protocol WAP-187-TLE2E-20010628-a. pp. 1-24.
BIG-IP® e-Commerce Controller 800, Jan. 9, 2002, 5 pages, http://www.f5products/bigip/ecommerce.
SONICWALL, Comprehensive Internet Security Solutions, SSL Center, Jan. 9, 2002, 1 Page, http://www.sonicwall.com/ssl-center/index.html.
Nokia , Secure Network Solutions, Secure Socket Layer (SSL) Acceleration, Jan. 9, 2002, 2 Pages, http://www.nokia.com/securenetworksolutions/itcm/ssl.html.
Jormalainen, et al., "Security in the WTLS," Internet Citation, Nov. 3, 1999, Retrieved from the Internet: www.tml.hut.fi/Opinnot/Tik-110. 501/1999/papers/wds.wtls.html. 17 pages.
Kwon, et al., "Integrated Transport Layer Security End-to-End Security Model Between WTLS and TLS," *Conference Proceedings Article*, 2001, pp. 65-71.
"PCT/US02/33997",Search Report, (Mar. 10, 2003), 3 pages.
http://www.networksorcery.com/enp/protocol/ip/ports09000.htm (1998-2011), Network Sorcery, Inc., printed from the internet on Aug. 3, 2011. 8 pgs.
U.S. Appl. No. 10/000,154 Notice of Allowance mailed May 6, 2011, 8pgs.

Luotonen, A., "Tunneling SSL Through a WWW Proxy", Netscape Communications Corporation, Dec. 14, 1995. XP002167506. pp. 1-4.
"Intel NetStructure: Expediting XML Transactions. Product Data Sheet. A Standish Group Research Note Copyright © 2000", 4 pages.
"Intel® Netstructure™ 7115 e-Commerce Accelerator; improve speed for secure online transactions", Product Overview. Webpage [online] [retrieved on Aug. 7, 2001] Retrieved from the Internet;<URL:http://www.intel.com.network/idc/products/accel_7115.htm., pp. 1-2.
"Intel® Netstructure™ 7115 e-Commerce Accelerator; improve speed for secure online transactions Technical Overview. Webpage [online] [retrieved on Aug. 7, 2001] Retrieved from the Internet<URL:http://www.intel.com.network/idc/products/accel_7115.htm.".
"Nokia WAP Server 1.1 Nokia: Product Data Sheet.", (Feb. 2000), pp. 1-2.
"PCT Notification of Transmittal of the International Search Report or the Declaration", PCT Search Report. PCT/US/02/33997, Mailing Date Mar. 24, 2003, 5 pages.
"PCT Search Report. PCT/US/03/00893.", 8 pages.
"PCT Written Opinion, PCT/US/03/08893, Mailing Date Oct. 22, 2003", 5 pages.
"Rainbow iVEA Introduces the iVEA NewSwift 2012. Security Appliance for Both Wireless and Wired Internet Connectivity", Webpage [online] Las Vegas, NV; May 8, 2001.[retrieved on Sep. 11, 2011] Retrieved from the Internet<URL:http://www.rainbow.com/press/pr010508.html., pp. 1-4.
"Secure Execution Engine. Whitepaper. nCIPHER", Retrieved from the internet on Sep. 27, 2001, pp. 1-12.
"SSL 3.0 Specification. Webpage [online] [retrieved Sep. 17, 2001] Retrieved from the Internet at: <URL:http://www.home.netscape.com/eng/ssl13/3-SPEC.HTM.", pp. 1-29.
"The Need of Security in WAP, WTSL: Wireless Transport Layer Security.", [online] [retrieved on Sep. 25, 2001] Retrieved from the Internet. <URL:http://www.server49.hypermart.net-vesit/pubs/papers/wtsl.htm., pp. 1-17.
"The Wireless FAQ. Webpage [online] allNetDevices—The Wireless FAQ:9.11.How secure is WAP with SSL and WTSL?", Last updated Jun. 26, 2001 [retrieved on Sep. 26, 2001] Retrieved from the Internet: <URL:http://www.devices.internet.com/faq?pair=09.010., pp. 1-3.
"W@P Forum. Wireless Application Protocol. WAP 2.0. Technical White Paper.", (Aug. 2001), pp. 1-13.
"WAP Forum™ Releases WAP 2.0 Specifications for Public Review. WAP 2.0 Integrates Latest Internet Standards and Content Technologies into Mobile Environment. Providing Platform for Richer Mobile Experience™." , Mountain View, California, (Aug. 1, 2001), pp. 1-5.
"Webpage [online] Fatbrain—The WAP Gap. [retrieved on Sep. 11, 2001] Retrieved from the Internet<URL:http://www.1.fatbrain.com/fbt/offers/wirelesscenter/wapgap.asp", p. 1-5.
"Wireless Application Protocol, Whitepaper. W@P Forum. Wireless Internet Today", (Jun. 2009), pp. 1-19.
Cobb, Stephen, "The flip side of the wireless explosion: Dealing with WAP-gap security risks", Webpage [online] Serverworld: Sun Server Archives: Jan. 2001 Issue. [retrieved on Sep. 11, 2001] Retrieved on the Internet :<URL:http://www.serverworldmagazine.com/sunserver/2001/01/wapgap.shtml., pp. 1-4.
"ROC (Taiwan) Patent Application No. 092100518 Search Report", (Jul. 11, 2009), 1 pg.
"Wireless Application Protocol Public Key Infrastructure Definition", Wireless Application Protocol Forum, Ltd., http://www.wapforum.org/, Version 24, Apr. 2001, pp. 1-46.
Wireless Application Protocol Forum, Ltd.: Wireless Application Protocol, Wireless Transport Layer Security Specification. WAP WTLS Version Nov. 5, 1999. URL: http://www.wapforum.org/what/technical_1_2.htm (retrieved on Jun. 16, 2010) 48 pgs.
Dierks, T.; Allen, C.: The TLS Protocol Version 1.0. Network Working Group, RFC 2246, Jan. 1999. URL: www.ietf.org/rfc/rfc2246.txt (retrieved on Jun. 16, 2010) 40 pgs.

* cited by examiner

```
1   BEGIN
2
3   DETECT METHOD OF ENCRYPTION
4       SWITCH DATA_TYPE
5           CASE: WTLS
6                   START WTLS HANDSHAKE
7                   COMPLETE AUTHENTICATION
8                   DECRYPT WTLS
9           CASE: SSL
10                  START SSL HANDSHAKE
11                  COMPLETE AUTHENTICATION
12                  DECRYPT SSL
13          CASE: PLAIN
14                  DO NOTHING
15  END
```

*FIG. 12*

| Map ID | Conn Type | KeyID | Server IP | Net Port | Ser Port | Cipher Suites | Re-direct | Client Auth | Digital Signature |
|---|---|---|---|---|---|---|---|---|---|
| 1 | WTLS | mysrv1 | 10.1.1.30 | 9202 | 80 | Low | n | y | y |
| 2 | SSL | mysrv2 | 10.1.1.30 | 443 | 80 | med(v2+v3) | n | y | y |
| 3 | PLAIN | NONE | 10.1.1.30 | 8080 | 80 | None | n | n | n |

*FIG. 24*

MECHANISM SUPPORTING WIRED AND WIRELESS METHODS FOR CLIENT AND SERVER SIDE AUTHENTICATION

RELATED APPLICATIONS

This application is a continuation-in-part of co-pending U.S. patent application Ser. No. 10/000,154, entitled "SELECTING A SECURITY FORMAT CONVERSION FOR WIRED AND WIRELESS DEVICES", filed on Oct. 23, 2001, and claims priority therefrom.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Intel Corporation, All Rights Reserved.

FIELD OF THE INVENTION

The invention relates generally to extending the capabilities of network security, and more particularly, to a mechanism for supporting wired and wireless architectures for client side certificates and server side certificates.

BACKGROUND OF THE INVENTION

The need for secure, scalable, and flexible internet applications and services is increasing rapidly in the wireless world. As wireless internet applications become common, there is a huge opportunity for appliances which can handle authentication and encryption mechanisms, as well as accelerate security-related functions.

In the wireless internet world, Wireless Transport Layer Security (WTLS) provides privacy and integrity for communications, using encryption and authentication functionality. The WTLS handshake protocol of the WAP (Wireless Access Protocol) forum establishes a secure connection between the client and the server by allowing the server to authenticate itself to the client by sending over its certificate. Likewise, the client can authenticate itself by sending its certificate (or a link to it) if client authentication is requested by the server.

In the wired internet world, security can be provided in the form of SSL (Secure Sockets Layer). SSL is a protocol that supports authentication of client and/or server, as well as encryption during a communications session.

As each generation of networks becomes more sophisticated, applications must be secure for both the wired and wireless internet. Under the current state of technology of the wireless internet, security-related functions may take place at the WAP gateway. However, this does not provide an end-to-end solution—since the user request is intercepted at the WAP gateway, the user can authorize the gateway, but not the server.

A solution to this problem, and a solution for the wired internet, is to offload security-related functions to the servers in these networks to handle security matters, including encryption and authentication. However, this leaves the servers with less processing power for data processing, and for content, for instance, to be provided to clients.

While some vendors provide security-related functions outside of the servers, these solutions only offer partial security solutions. For example, although nCipher of Woburn, Mass. provides the encryption service extraneous to the servers, it does not provide the authentication service.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 is pseudocode for establishing a handshake between a client and a server in accordance with general embodiments of the invention.

FIG. 24 is illustrates an example configuration for a security system.

DETAILED DESCRIPTION OF THE INVENTION

Figure 1:
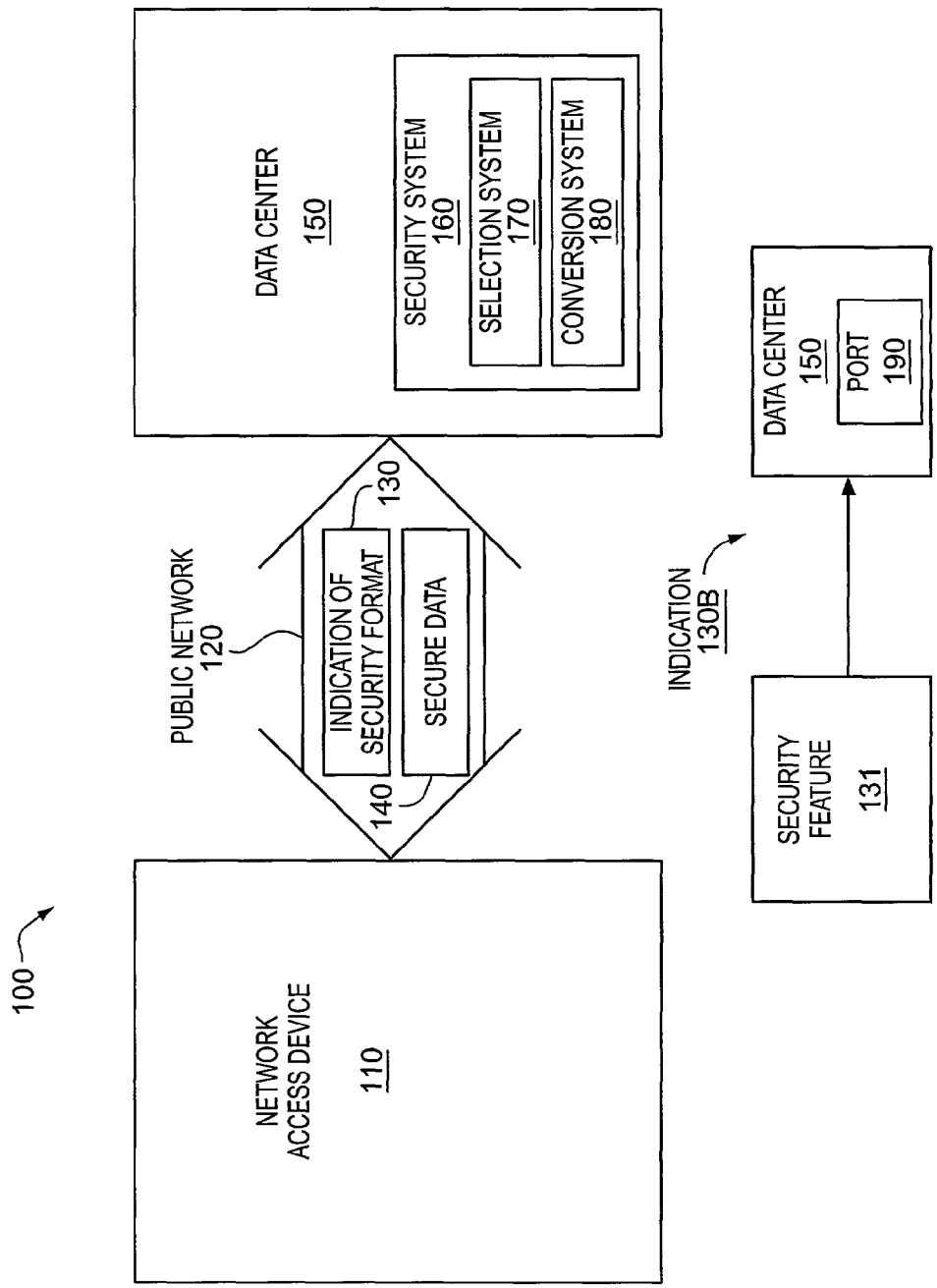
FIG. 1 shows a security system within a data center, according to one embodiment.

In one aspect of the invention is a method to incorporate security functions, including encryption and authentication, into a single network device for both the wired and wireless internet, such that servers are offloaded of this function, and of the need to worry about the different security standards and authentication mechanisms.

The method comprises sending a message from a client to a server for establishing a secure connection. The message is intercepted by a security system that is associated with the server. The security system performs authentication functions, including the authentication of the client, as well as supporting functions for the authentication of the server. If the authentication functions are properly made, then a secure connection is established.

As used herein, the term internet may comprise an internetwork, defined as a set of computer networks that may be dissimilar and are joined together by means of gateways that handle data transfer and conversion of messages from the sending networks' protocols to those of the receiving network; an intranet, which is a private network based on Internet protocols such as TCP/IP but designed for information management within a company or organization; or the Internet, defined as the worldwide collection of networks and gateways that use the TCP/IP suite of protocols to communicate with one another.

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

FIG. 1 shows a simplified block diagram of a secured communication system 100. As discussed herein, a system, such as a system for selecting a security format conversion, may be an apparatus including hardware, software, or some combination of hardware and software to process data. The system 100 includes a network access device 110 communicatively coupled with a data center 150 via a public network 120 to provide an indication of a security format 130 and secure data 140 to the data center 150. The data center 150 comprises a security system 160 having a selection system 170 to select a security conversion based on the indication 130 and a conversion system 180 to perform the selected security conversion on the secure data 140.

The network access device 110 may be any electronic device operable to connect with and transmit data over the network 120. For example, the access device 110 may include a wired device (e.g., a personal computer, workstation) or a wireless device (e.g., a laptop, personal digital assistant (PDA), mobile phone, pager, smartphone, or communicator). Typically wired devices use different security formats or protocols than wireless devices to take advantage of larger memory, processor, and bandwidth resources.

The public network 120 may be any network comprising at least a non-private portion that is shared by entities other than the network access device 110 and the data center 150. The public network 120 may be comparatively untrusted, unsecured, and more susceptible to a security breach during transfer (e.g., a man-in-the-middle attack) relative to a private network (e.g., an intranet) that may be used internally within the data center 150. According to one embodiment, the public network 120 includes a wireless network, a WAP gateway, and the Internet and provides end-to-end security between a wireless access device 110 and the data center 150.

The data center 150 may be any one or more computer systems connected with the public network 120 to receive or provide secure data over the public network 120. For example, the data center 150 may include a plurality of privately networked computer systems that provide such functions as a firewall, a server, and a data source.

The network access device 110 transmits the indication of a security protocol 130 to the data center 150 via the network 120. Different embodiments of the indication 130 are contemplated. According to a first embodiment the indication 130 includes information to request and define a connection between the network access device 110 and the data center 150.

According to a second embodiment the indication 130 includes an indication of a port for example a message associated with a particular security format received on a port configured to receive that particular security format. The term "port" will be used to refer to a logical linkage or interface between data received from the network 120 and a component of the data center 150 such as an application, module, or higher-level protocol. The port may have a corresponding port number that is assigned to the component and that may be used to link or direct data received from the network 120 with the component or service. According to one embodiment the port may comprise a well-known port having a well-known port number. For example, the port may be the well-known port 80 used for HTTP data or the port may be the well-known port 443 used for SSL data. A message received from the network 120 may include a port identifier that identifies the component. According to one embodiment a port may be implemented by an operating system directed software process that listens to data received from the network 120 on a physical interface, such as a network interface card (NIC) linked to the network with a gigabit Ethernet or RJ45 connection, for the port identifier that identifies the port and the component. The port identifier and an IP address together form a socket that specifies an endpoint of a connection. An end-to-end communication between the device 110 and the data center 150 may be specified by a four-tuple comprising a port and IP address of the device 110 and a port and IP address of the data center 150.

According to a third embodiment the indication 130 includes an indication of a security format supported by, preferred by or both supported and preferred by the network access device 110. For example, the indication 130 may comprise a security feature supported by or preferred by the access device 110 that is announced in a pre-data phase security negotiation message such as a client hello message sent during a security handshake. The term "security feature" will be used to broadly refer to features, parameters, and options that describe or define a security format and includes but is not limited to security features selected from the group comprising version information, option information (e.g., certification or no certification), encryption algorithm information, security parameter information, cryptographic parameter information, trusted certificate information, and other security feature information.

According to a fourth embodiment the indication 130 includes both an indication of a port associated with the security format and an indication of a security feature that is supported by the device 110. For example, exemplary indication 130B includes a security feature 131 provided to a port 190 (which may include well-known port 443) of the data center 150.

According to a fifth embodiment the indication 130 includes a session identification corresponding to a previous security format or conversion. According to a sixth embodiment the indication 130 includes a profile identification (e.g., a user identification and password) that allow access of a security format or security conversion from a profile in the data center 150. According to a seventh embodiment the indication 130 includes a dedicated unambiguous indication of a security format for example SSL version 3.0. According to a eighth embodiment the indication 130 includes a dedicated unambiguous indication of a security conversion for example logic or a module to convert from SSL version 3.0 to plain data. Many other embodiments of the indication 130 are contemplated and a person having an ordinary level of skill in the art and having the benefit of the present disclosure will appreciate that the indication 130 should be interpreted broadly.

As discussed above, different indications 130 are contemplated and the selection system 170 may accordingly make different selections. According to a first embodiment the selection is based on information received from the network 120. According to a second embodiment the selection is based on connection information associated with establishing a connection between the network access device 110 and the data center 150. According to a third embodiment the selection is based on port information. For example, the selection system 170 may select a first conversion if connection information is received at a first predetermined configured port and select a second conversion if connection information is received at a second port. According to a fourth embodiment the selection is based on security feature information indicating security format features that are supported, preferred or both supported and preferred by the device 110. For example, the selection system 170 may select a conversion based on a supported and preferred security format announced in a client hello message.

According to a fifth embodiment the selection may be based on port information and security feature information. For example, the selection system 170 may select a conversion from a security format based on a port that a client hello message is received upon and based on security features indicated in the client hello message to be supported and preferred by the client device 110.

According to a sixth embodiment, selection may be based on a session identification corresponding to a previous security format or conversion. According to a seventh embodiment selection may be based on a profile identification (e.g., a user identification and password) that allows the selection system 170 to access of a security format or security format conversion from a profile. According to an eighth embodiment, selection may be based on a stated security format or security format conversion (e.g., "SSL V3.0 to plain data"). Many other selections and selection systems 170 are contemplated and a person having an ordinary level of skill in the art and the benefit of the present disclosure will appreciate that selection and the selection system 170 should be interpreted broadly.

The conversion is from the received security format to another format. The other format may be a plain unencrypted data format. This may be advantageous when the data center 150 is sufficiently internally secure and provides sufficiently little risk of an unintended or unauthorized access to the data. Advantageously, this may avoid a subsequent decryption within the data center 150. According to an alternate embodiment, the other format may be a different security format. That is the security system 160 may select and implement a conversion from one security format to a different security format. For example, the conversion may be to IP security (IPSec), which may be desired for security within an intranet of the data center 150.

The network access device 110 transmits secure data 140 to the data center 150 via the network 120. The data center 150 receives the secure data 140 from the network 120. The conversion system 180 performs the selected security conversion on the secure data 140. Without limitation, the secure data 140 may be transactional and/or financial data and the data center 150 may use and/or respond to the data as desired for the particular implementation.

Figure 2:
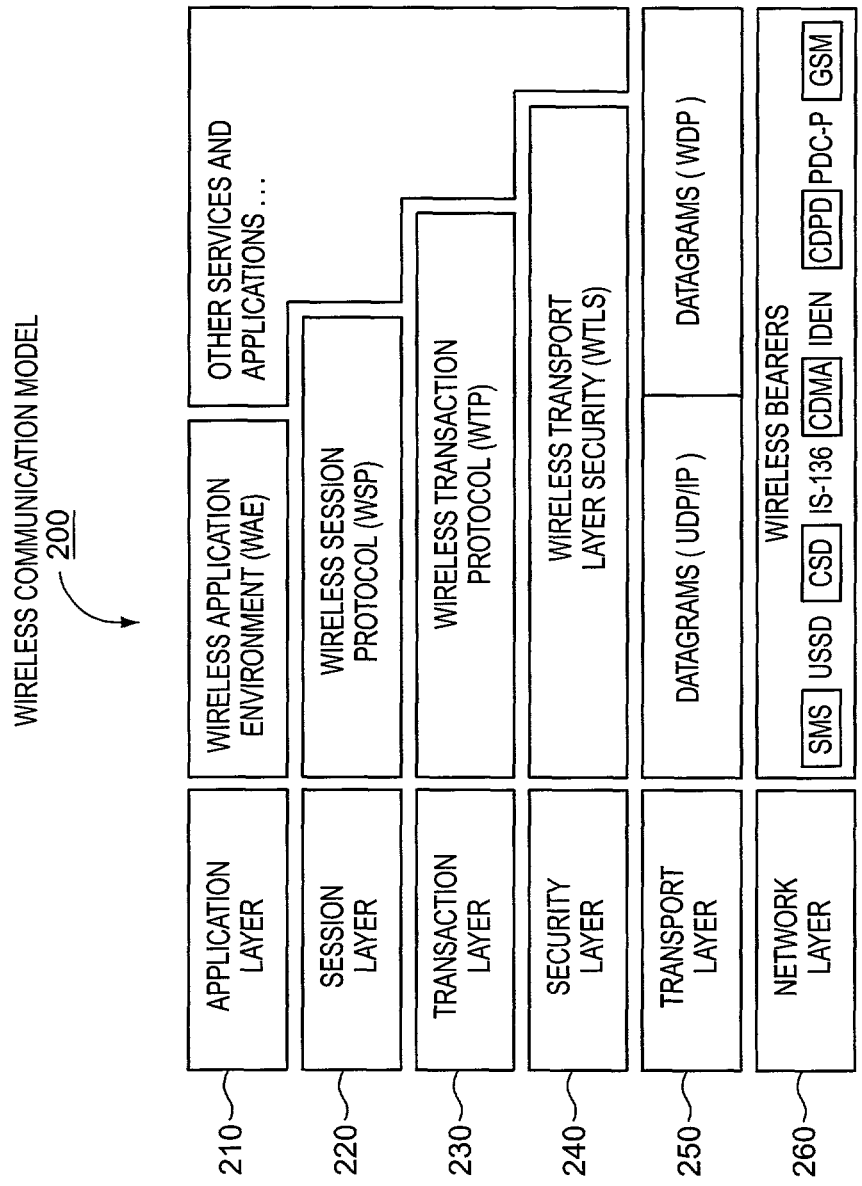
FIG. 2 shows a WAP stack, according to one embodiment.

According to one embodiment the network access device 110 is a wireless network access device that uses a WAP stack 200 shown in FIG. 2 to communicate with the data center 150. The WAP stack 200 is a secure specification that allows the wireless device to securely access information via the network 120. The WAP stack 200 includes an application layer 210, a session layer 220, a transaction layer 230, a security layer 240, a transport layer 250, and a network layer 260. The WAP stack 200 is well known to a person that has an ordinary level of skill in the art and is described in greater detail in versions 1.2 and 2.0 of the WAP specification, which is available at http://www.wapforum.org.

The security layer 240 includes the WTLS protocol and may provide privacy, data integrity and client/server authentication for WAP enabled wireless devices. The WTLS protocol operates above the transport layer 250 and provides the upper level WAP layers 210-230 with a secure transport service interface that preserves the transport interface below and also presents methods to manage secure connections. WTLS is related to non-wireless protocols such as Secure Sockets Layer (SSL) but involves comparatively lower device side processing power and memory requirements, lower bandwidth, and datagram connection.

The transport layer 250 may include different datagram-based transport layer protocols such as UDP/IP and WDP. UDP operates with IP bearer services whereas WDP operates with non-IP bearer services. For example, WDP may be used with Short Message Service (SMS) and similar wireless bearer services whereas UDP may be used with Circuit Switched Data (CSD) and similar bearer services.

Figure 3:
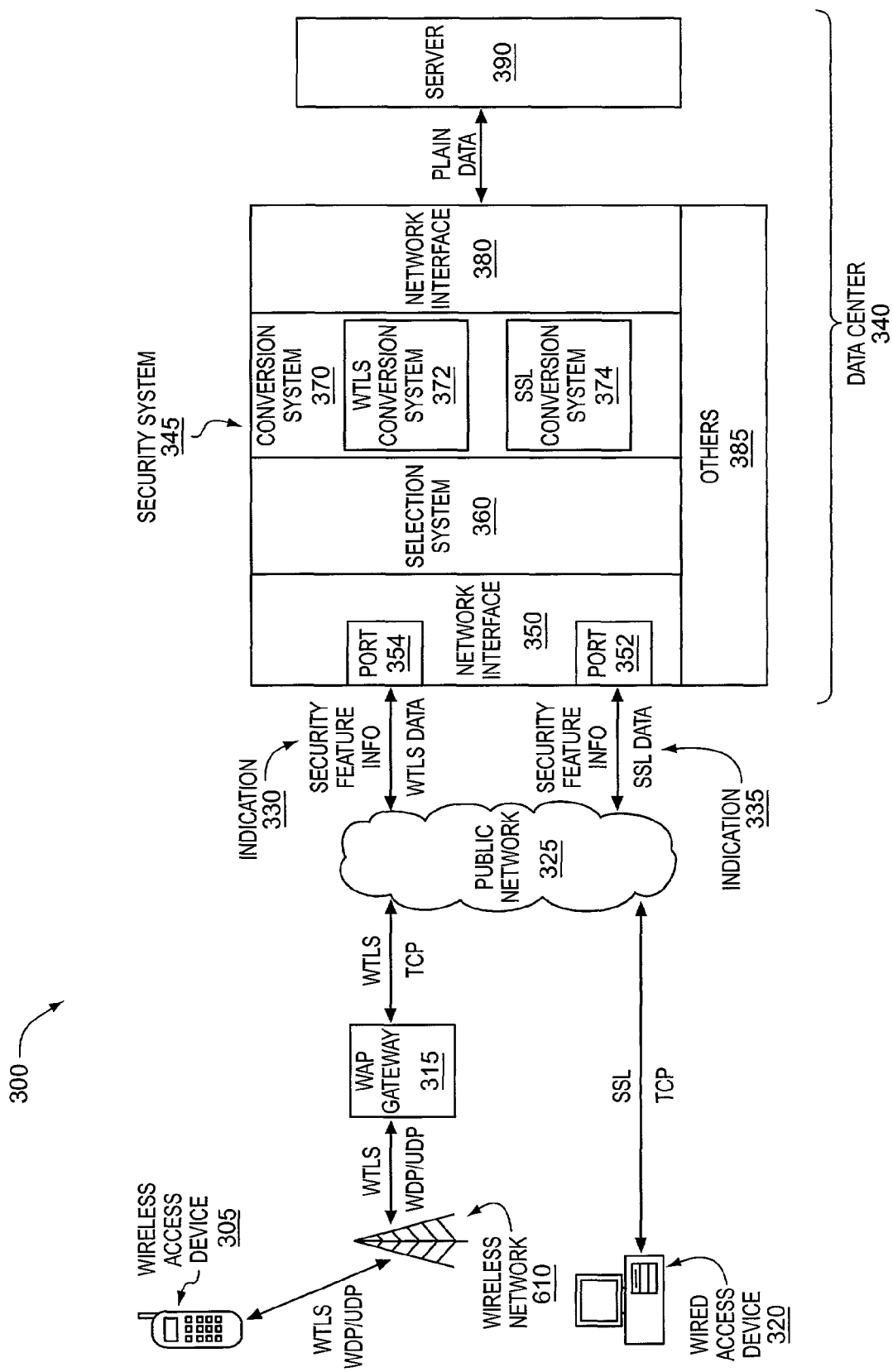
FIG. 3 shows a system architecture, according to one embodiment.

FIG. 3 shows a simplified block diagram of the system architecture 300 of one embodiment of the invention. The system architecture 300 includes a wireless access device 305 and a wired access device 320 to transmit heterogeneously encrypted messages through a public network 325 to a data center 340 comprising a security system 345 to select and implement different security conversion processing for the received heterogeneous encrypted messages.

The wireless access device 305, in one embodiment a WAP microbrowser enabled cell phone, is coupled to the public network 325, in one embodiment the Internet, via a wireless network 310 and WAP gateway 315. The wireless access device 305 generates and transmits a WTLS client hello message comprising security feature information corresponding to security capabilities and preferences of the device 305 to the wireless network 310 using either UDP or WDP transport protocol. The wireless network 310 receives the message and conveys it to the WAP gateway. The WAP gateway converts the transport protocol medium from either UDP or WDP to TCP and then passes the message to the public network 325 using TCP.

A wired access device 320, according to one embodiment a browser enabled personal computer, generates and transmits a message containing security feature information to the public network 325. The message may comprise an SSL client hello message used to initiate negotiation of a security format in an SSL handshake.

The public network 325 is functionally connected with the wireless access device 305, the wired access device 320, and the data center 340 to receive the messages from the devices 305, 320 and provide the messages to the data center 340. According to one embodiment, the network 325 includes the Internet and may use TCP or UDP as protocols for transport medium. The network 325 transmits or communicates the messages to the data center 340 as indications 330 and 335.

The data center 340 is coupled with the public network 325 to receive the messages associated with the devices 305 and 320. The data center 340 includes a security system 345 that according to one embodiment is functionally disposed between the public network 325 and a server 390 so that the security system 345 may perform security conversion selection and execution on behalf of the server 390.

According to one embodiment the security system 345 includes a network interface 350 to receive indications and secure data, a selection system 360 to select a conversion based on the indications, a conversion system 370 to receive the selected conversion and implement the selected conversion on secure data received via the network interface 350, and a second network interface 380 to receive converted data and provide the converted data to other data center 340 components such as in one embodiment a server 390.

The network interface 350 may include one or more NIC to receive the messages and secure data on behalf of the data center 340. According to one embodiment, the network interface 350 includes at least one port 354 to receive information from the wireless access device 305 and at least one port 352 to receive information from the wired access device 320. For example, the network interface 350 may include a first and second ports 354 to respectively receive secured and unsecured data from the wireless access device 305 and a second and third ports 352 to respectively receive secured and unsecured data from the wired access device 320.

The selection system 360 is coupled with the network interface 350 to receive security conversion selection information from the network interface 350 and select a security conversion based on the information. The security conversion may be a conversion from a security associated with the information to another format (e.g., another secured format or a plain data format). According to a first embodiment the selection system 360 selects a security conversion based on a received indication of a port. For example, the selection system 360 may receive an indication of a predetermined port known to be used for SSL encrypted data and select at least one security conversion from SSL encrypted format to another format. According to a second embodiment the selection system 360 selects at least one security conversion based on received security feature information. For example, the selection system 360 may receive security feature information indicating a security feature or set of security features that are supported by the wired access device 320 and select a conversion from that security to another format. According to a third embodiment the selection system 360 selects a conversion based on both port information and security feature information. For example, the selection system 360 may select either a WTLS conversion system 372 having at least one particular conversion from a WTLS format to another format or an SSL conversion system 374 having at least one particular conversion from an SSL format to another format based on the port information and may select either the particular WTLS or SSL conversion based on the security feature information.

The selection system 360 may provide the selected security conversion to other system 300 components. According to one embodiment, the selection system 360 associates a session identification for a session between a device 305 or 320 and the data center 340 with the selected security conversion. This may allow subsequently received data in secured format to be associated with the selected security conversion. In one embodiment, the selection system 360 may notify the conversion system 370 of the selected conversion by asserting a security conversion selection signal. For example, the selection system 360 may make a method call to the conversion system 370, the WTLS conversion system 372, or the SSL conversion system 374 conveying the selected conversion.

After a security format has been negotiated between the devices 305, 320 and the security system 345, the devices 305, 320 may transmit secure data to the security system 345. In particular, the wireless device 305 may transmit data in a predetermined version of WTLS. The wireless network 310 may receive the secure data and provide it to the WAP gateway 315. Typically the WAP gateway 315 will perform a conversion from either UDP or WDP to TCP and provide the TCP formatted data to the public network 325.

According to one embodiment the WAP gateway 315 is configured to let the received WTLS secure data pass though without security format conversion. Advantageously, this approach may provide end-to-end security between the wireless access device 305 and the data center 340 and may eliminate the WAP gap that exists when WTLS data is converted to SSL data via a vulnerable plain data state that is open to a man-in-the-middle attack. Different configurations are contemplated including one in which the WAP gateway 315 is configured to let all wireless connections to the data center 340 pass without security format conversion. This approach also provides reduced latency compared with the prior art approaches shown in FIGS. 1-3, since unnecessary security format conversion processing and transmission to and from the system 330 may be avoided.

The wired access device 320 may transmit data in a predetermined version of SSL that has been negotiated with the security system 345. The data may be transmitted in SSL format using TCP over the Internet 325.

The conversion system 370 is coupled with the selection system 360 to receive the selected security conversion and coupled with the network interface 350 to receive the secure data from the wireless device 305 and the wired device 320. The conversion system 370 implements the selected conversion on the received secure data. The conversion system 370 may include logic including software, hardware, or some combination of software and hardware to decipher the received secure data (e.g., WTLS or SSL encrypted data) into a plain unencrypted data format and if desired to re-encrypt into an alternate security protocol format. According to one embodiment the logic may include conventional conversion logic that is well known to a person having an ordinary level of skill in the art and the benefit of the present disclosure.

As stated, the security system 345 may include different conversion modules to perform conversion from a received security format to another format. According to one embodiment, the conversion system 370 includes a WTLS conversion system 372 and an SSL conversion system 374 to convert WTLS or SSL secure data, respectively, into a different security format. The WTLS conversion system 372 may include a plurality of conversion modules, for example, a first conversion module from a first version of WTLS having a first security feature to plain data, a second conversion module from a second version of WTLS having a second security feature to plain data, and a third conversion module from the first version of WTLS to another secured format such as SSL, IPSec, or others. Similarly, the conversion system 374 may have a plurality of conversion modules.

The conversion system 370 provides converted data to a network interface 380 that is coupled with the server 390. The network interface 380 may include a NIC. Typically the network interface 380 provides plain data to the server 390 via a plain data port, such as port 80, although other embodiments are contemplated.

The server 390 receives the converted data. If the converted data is in a secured format the server 390 may perform deciphering. Without limitation, the server 390 may perform any processing that is desired for the particular implementation. Typically, the processing will include providing responsive data to the devices 305, 320 via the security system 345. According to one embodiment the server 390 provides plain data to the security system 345.

The security system 345 may receive the responsive data and perform security processing on the data. According to one embodiment the security system 345 processes the responsive data by a substantial reversal of the initial conversion. For example, for responsive data to the wireless device 305 the security system 345 may convert plain data from the server 390 to WTLS format and provide the secure data to the wireless device 305. Similarly, for responsive data to the wired device 320 the security system 345 may convert plain data from the server 390 to SSL format and provide the secure data to the wired device 320.

The system 300 may offer a number of advantages. A first advantage may be an ability to off-load security processing functions from the server 390 to the security system 345. Security processing may be quite processor and memory intensive and may consume a significant portion of the resources of the server 390 without such off-loading. Off-loading may also allow the server 390 to handle more connections. For example, with a security system 345 that performs security conversion the server 390 may be able to handle approximately 5-10 times the number of connections as without.

A second advantage is end-to-end security between the access devices 305, 320 and the server 390. A third advantage is a single security conversion between the access devices 305, 320 and the server 390. This may provide a faster exchange of data due to less computation and less latency. A fourth advantage is that the security system 345 may provide a single point security solution for both wireless and wired security protocols. A fifth advantage is that frequently it may be easier to update the security system 345 with the most current security standards and conversions rather than updating the server 390.

The security system 345 has been shown in simplified format so as not to obscure the invention. However, those having an ordinary level of skill in the art and the benefit of the present disclosure will appreciate that other components 385 may be included in the security system 345. Frequently the other components 385 will include an operating system or platform. The other components 385 may also include components that may be desired for the particular implementation such as components to perform XML transformation, XML parsing, content based routing, and other plain data functions. The other components 385 may include a component used in a conventional dedicated security accelerator such as an Intel® NetStructure™ 7110 e-Commerce Accelerator, a 7115 e-Commerce Accelerator, a 7140 Traffic Director, a 7175 Traffic Director, a 7180 e-Commerce Director, a 7280 XML Director, or a 7210 XML Accelerator, which are each available from Intel Corporation of Santa Clara, Calif.

Figure 4:
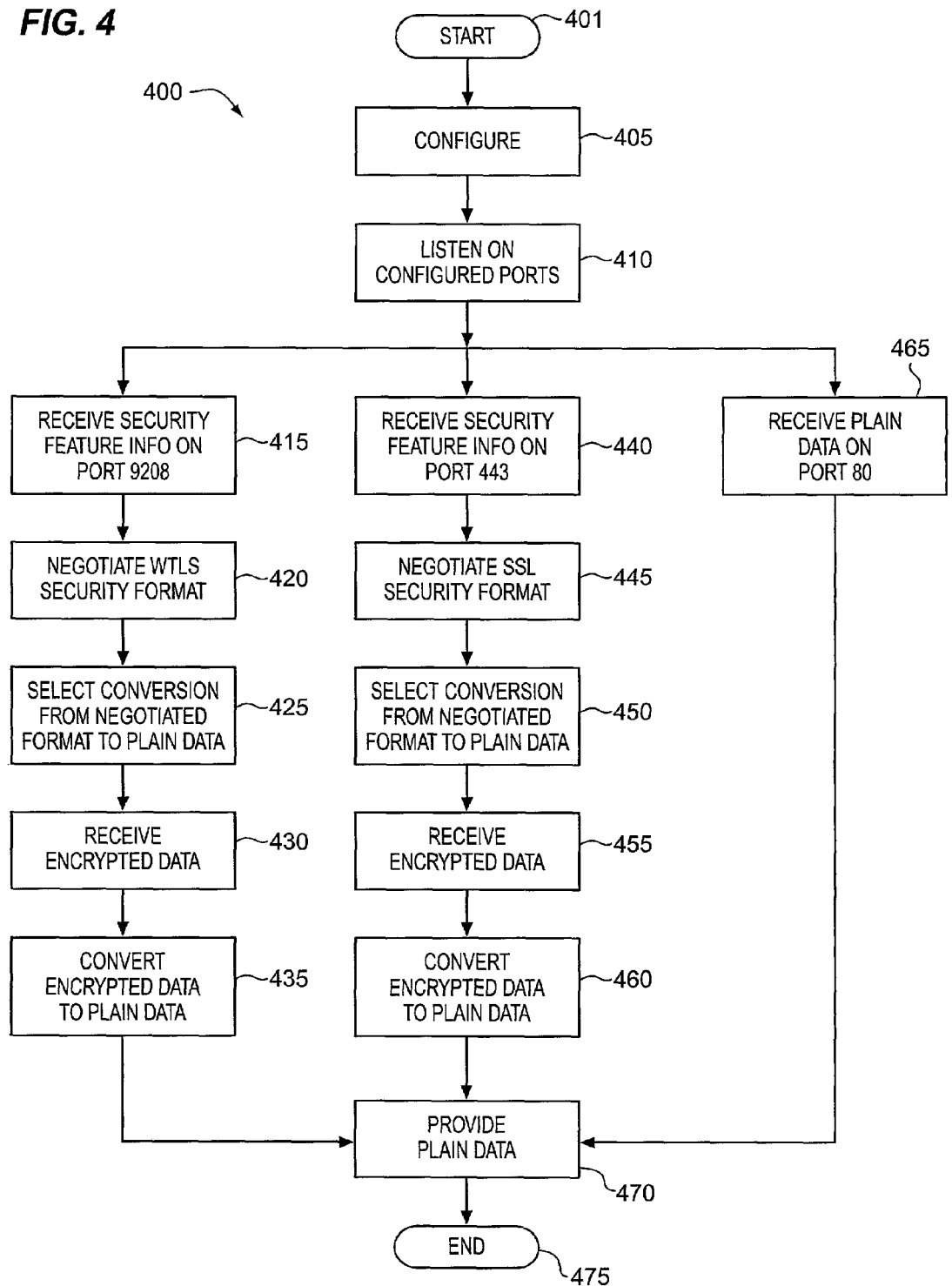
FIG. 4 shows a method for operating a security system, according to one embodiment.

FIG. 4 illustrates in block diagram form a method 400 for operating a security system, such as security system 160 or 345, according to one embodiment. The method 400 may be implemented in logic that may include software, hardware, or a combination of software and hardware.

The method 400 commences at block 401 and then proceeds to block 405 where the security system is configured. According to one embodiment this may include reading a configuration file containing system configuration information. For example, without limitation the security system may access configuration information such as contained in the following table:

TABLE 1

| MAP ID | CONNECT TYPE | KEY ID | SERVER IP | NET PORT | SERVER PORT | CIPHER SUITES | RE-DIRECT |
|---|---|---|---|---|---|---|---|
| 1 | WTLS | WAPSRV | 10.1.1.30 | 9208 | 80 | LOW | YES |
| 2 | SSL | HTTPSRV | 10.1.1.31 | 443 | 80 | MED | YES |
| 3 | HTTP/PLAIN | NONE | 10.1.1.31 | 80 | 80 | NONE | NO |
| 4 | WAP/PLAIN | NONE | 10.1.1.30 | 80 | 80 | NONE | NO |

In the above table the map ID provides an arbitrary identifier for a connection, the connection type provides a type of the connection either secured or unsecured, the key ID provides key identifications to use for the secured connection, the server IP provides an Internet Protocol address to communicate with servers in the data center, the network port provides predetermined known port numbers to receive secured or unsecured data from a public network, the server port provides a well known predetermined port to communicate plain data to the servers in the data center, the cipher suites contains an indication of security strength used for the secured and unsecured connections, and the redirect provides an option to redirect an access device to security upgrade resources in the event the device does not support the used security features.

Consider without limitation the following exemplary implementation of the redirect feature. The security system determines whether the client meets the security level specified in the configuration. If the client does not meet the specified security level the security system may determine whether a redirect page should be sent as a Uniform Resource Locator (URL) to present an opportunity for the client to upgrade to the specified security level. If the redirect page is not to be sent a default error message may be sent instead.

Alternatively, rather than using separate servers the same server may be used to serve both HTML and Wireless Markup Language (WML) content on different net ports such that the server IP net port combination is unique. For example, the security system may use configuration information such as contained in the following table:

TABLE 2

| MAP ID | CONNECT TYPE | KEY ID | SERVER IP | NET PORT | SERVER PORT | CIPHER SUITES | RE-DIRECT |
|---|---|---|---|---|---|---|---|
| 1 | WTLS | WEBSRV1 | 10.1.1.32 | 9208 | 80 | LOW | YES |
| 2 | SSL | WEBSRV2 | 10.1.1.32 | 443 | 80 | MED | YES |
| 3 | PLAIN | NONE | 10.1.1.32 | 80 | 80 | NONE | NO |

The method 400 advances from block 405 to block 410 where processes listen on the configured ports for activity or messages. According to one embodiment the processes listen on unique sockets comprised of a unique combination of an IP address and a port. According to one embodiment the security system spawns separate processes or threads to listen on the ports identified in the configuration file. For example a process may listen on port 9208 for WTLS related messages, a process may listen on port 443 for SSL related messages, and a process may listen on port 80 for unsecured data.

The method 400 may advance from block 410 to block 415 if security feature information is received on port 9208. According to one embodiment, the security feature information may include a client hello message from a wireless access device. For example, the security feature information may include a client hello message for an existing or future version of WTLS.

The method 400 advances from block 415 to block 420 where a WTLS security format is negotiated. The negotiation may be based on security feature information that indicates security features that the wireless device prefers or is operable to use. The negotiation may include a back-and forth exchange of security feature capabilities and/or preferences between the access device and the data center to agree upon a mutually supported security format. According to one embodiment the negotiation of block 420 includes a WTLS handshake protocol. Different embodiments of the negotiated security format are contemplated. According to a first embodiment the security format includes an existing or future version of WTLS. According to a second embodiment the security format includes a negotiated security feature such as a cryptographic parameter, a cryptographic algorithm (e.g., Data Encryption Standard (DES)), or both.

The method 400 advances from block 420 to block 425 where a conversion from the negotiated security format to an unencrypted plain data format is selected. Conversion to plain data format may be advantageous in architectures where the security system is coupled with a data destination (e.g., data center server) by a sufficiently trusted connection or network, since the server may then receive plain data and not perform deciphering.

According to a first embodiment, the conversion is selected based on reception of information on port 9208. For example, the conversion may be selected based on information associated with block 415. According to a second embodiment, the conversion is based on a security negotiation. For example, the conversion may be selected based on information associated with block 420. The selected security conversion may be communicated to other components such as a conversion system or a conversion module.

The method 400 advances from block 425 to block 430 where secure encrypted data is received. The secure data may be received over port 9208 and may be in the negotiated security format of block 420. The method 400 advances from block 430 to block 435 where the received encrypted data is converted to plain data. This may be done using conventional or well-known methods. Blocks 430 and 435 may be implemented using a batch or continuous mode.

The method 400 may advance from block 410 to block 440 if security feature information is received on port 443. For example, the security feature information may be associated with a connection https://www.intel.com that indicates to the data center that the client device will try to connect to port 443. According to one embodiment, the security feature information may include a client hello message from a wired access device. For example, the security feature information may include a client hello message for an existing or future version of SSL.

The method 400 advances from block 440 to block 445 where an SSL security format is negotiated. The negotiation may be performed in analogous fashion to that described for block 420 to determine a security format that may be based on SSL and that may include and SSL cryptographic parameter and SSL algorithm.

The method 400 advances from block 445 to block 450 where a conversion from the negotiated security format to an unencrypted plain data format is selected. According to a first embodiment, the conversion is selected based on reception of information on port 443. For example, the conversion may be selected based on information associated with block 440. According to a second embodiment, the conversion is based on a security negotiation. For example, the conversion may be selected based on information associated with block 445.

The method 400 advances from block 450 to block 455 where data in the negotiated security format is received at port 443. The method 400 advances from block 455 to block 460 where the received data is converted from the secure format to a plain data format.

The method 400 may advance from block 410 to block 465 if plain unencrypted data is received on port 80.

The method 400 may advance from block 435, 460, or 465 to block 470 where plain data is provided to a desired destination. According to one embodiment the data is provided to a server or other computer system of the data center. The server may be identified by a network address in configuration information. According to one embodiment the data is provided to the server over well-known port 80. The method 400 may terminate at block 475.

Alternate embodiments of the method 400 are contemplated. According to a first alternate embodiment, different ports are configured and used. Typically the ports for receiving security feature information and data will conform to designations by the Internet Assigned Numbers Authority (IANA) or a similar authority. According to one embodiment, the WTLS port may be a port selected from the group of ports having numbers between 9208 and 9282. According to a second alternate embodiment, a security conversion from the negotiated format of blocks 420 or 445 may be selected to another security format rather than to a plain data format. This may be advantageous when the data destination is coupled with the security system by a link that is not sufficiently secure. For example, rather than providing plain data at block 470 the secure data in WTLS format may be converted to secure data in SSL format and provided to the data destination. Such a conversion may be advantageous when the data destination is unable to decipher the pre-conversion security format.

Figure 5:
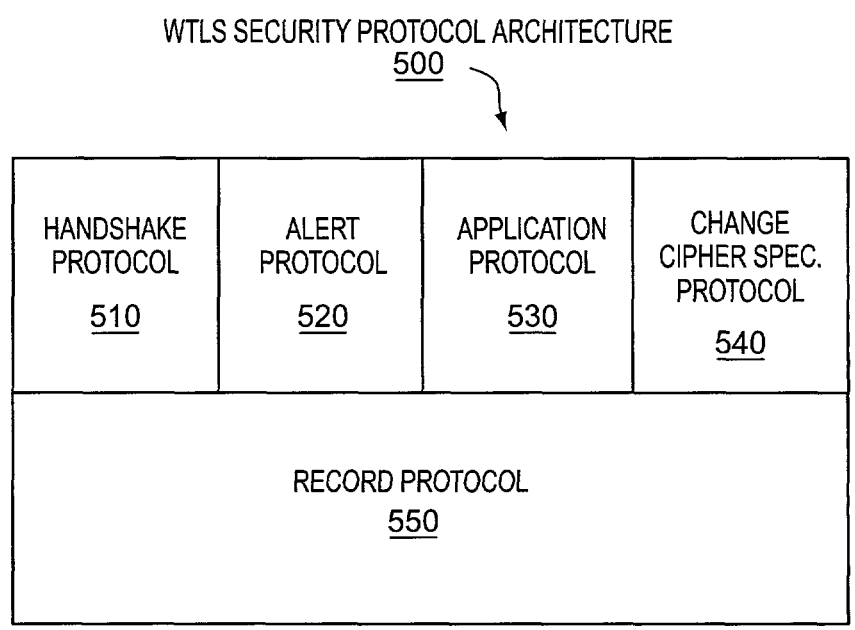
FIG. 5 shows a WTLS security protocol architecture, according to one embodiment.

FIG. 5 shows WTLS security architecture 500, according to one embodiment. The architecture 500 includes a record protocol 550 to accept unsecured data from upper stack layers to be transmitted, take care of data integrity and authentication, and apply compression and encryption algorithms to the data. The architecture 500 also includes four protocol clients including a handshake protocol 510 as discussed below, an alert protocol 520 to provide ways to terminate secure connections, an application protocol 530 to interface with upper stack layers, and a change cipher spec protocol 540 to allow coordinated changing between read, write, and pending states.

The handshake protocol 510 represents one embodiment of a security negotiation between a wireless access device and a data center. The handshake protocol 510 allows the device and the data center to negotiate or agree upon security methods and parameters such as a security protocol, protocol version, cryptographic algorithm, authentication, public key technique, and other security features.

Figure 6:
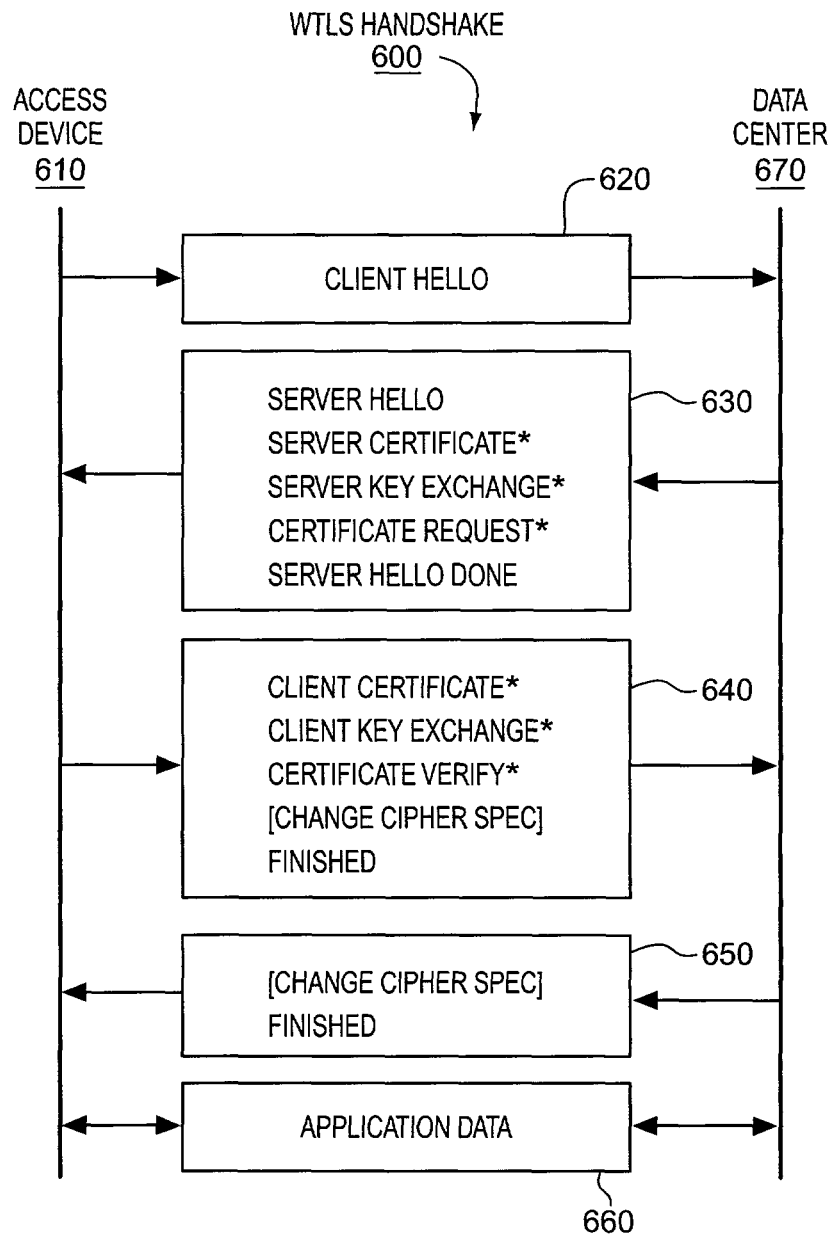
FIG. 6 shows a WTLS handshake, according to one embodiment.

FIG. 6 shows a block flow diagram of a WTLS handshake 600, according to one embodiment. The handshake 600 may be used to negotiate a security format between a wireless access device client 610 and a data center server 670. According to one embodiment the handshake 600 comprises security feature information.

The handshake 600 begins by the client 610 providing a client hello message to a data center 670 at block 620. The client hello typically announces supported security features (e.g., protocols, versions, options, encryption algorithms, and trusted certificates). According to one embodiment the client hello at least partially indicates a security format. After the client hello the access device client 610 receives messages until the data center server 670 sends a server hello done message.

The handshake 600 advances from block 620 to block 630 where the data center server 670 continues the handshake 600. The data center server 670 may provide a server hello message that agrees or renegotiates the security format method and parameters. The server 670 may also send a server certificate message if authentication is to be used, a server key exchange message to provide a public key that may be used to conduct or exchange a pre-master secret value, a certificate request message to ask the client for a certificate and authentication, and a server hello done message to indicate that the hello-message phase of the handshake 600 is complete. The server 670 then awaits a response from the client 610.

The handshake 600 advances from block 630 to block 640 where the access device client 610 continues the handshake 600. The client 610 may send a client certificate message if requested to authenticate itself (or a no certificate alert), a client key exchange message based on the public key algorithm selected between the client hello and the server hello and comprising a pre-master secret encrypted with the data center server's public key, a digitally-signed certificate verify message to explicitly verify the certificate if the client 610 has sent a certificate with signing ability, a change cipher spec message to indicate to start using the negotiated security parameters, and a finished message comprising verification of previous data including calculated security information under the new algorithms, keys, and secrets.

The handshake 600 advances from block 640 to block 650 where the data center server 670 continues the handshake 600. The data center server 670 may respond with a cipher spec message to confirm the session and inform the client 610 to use the negotiated session parameters, and a finished message that includes verification of exchanged and calculated information.

The handshake 600 advances from block 650 to block 660 where the client 610 and server 670 may exchange secure data using the established and negotiated secure connection. The handshake 600 may also include preserving information about the secure connection, such as a session identifier, so that future secure data exchange may be based on previously negotiated security methods and parameters.

Figure 7:
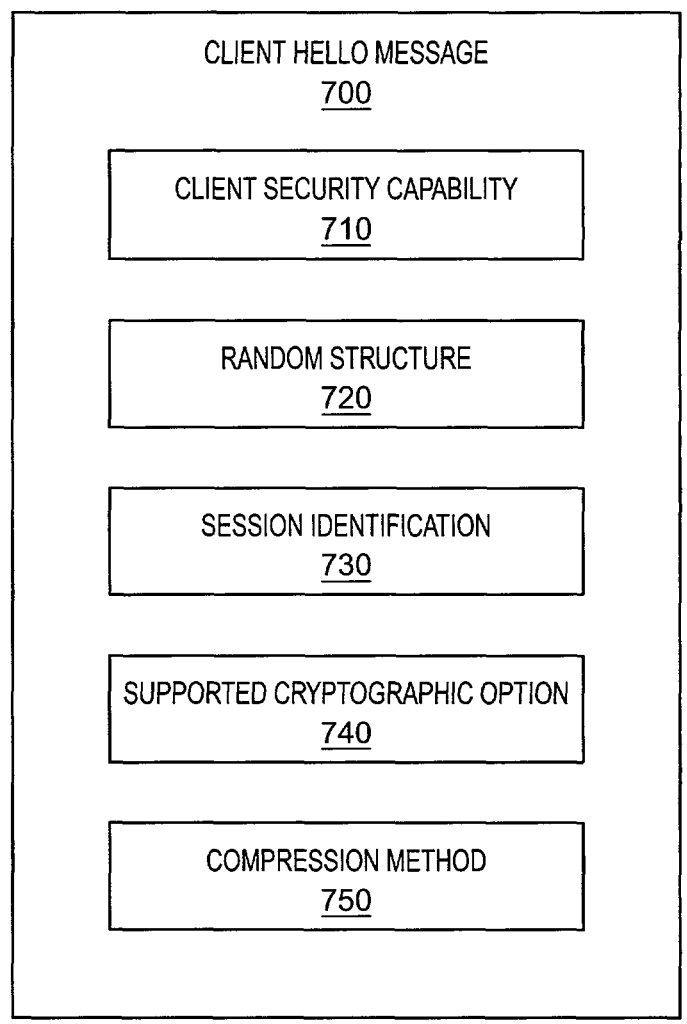
FIG. 7 shows a client hello message, according to one embodiment.

FIG. 7 shows a client hello message 700, according to one embodiment. The client hello message 700 may be for SSL, WTLS, or for another security format. According to one embodiment, the client hello message 700 received on a port comprises an indication of a security format. The client hello message 700 includes security feature information such as client security capability information 710, random structure information 720, session identification information 730, supported cryptographic option information 740, and compression method information 750.

The client security capability information 710 may include a protocol version. The protocol version may be a version the client is operable to use, desires to use, or both. For example, the information 710 may indicate SSL version 3.0 or another protocol version. According to one embodiment, a security system in a data center may use the client version information to negotiate a security format and select a corresponding security conversion.

The random structure information 720 may include a client-generated random structure. The random structure may include a plurality of bits based on the current time and date according to an internal clock of the client and a plurality of random bytes that are generated by a security random number generator.

The session identification information 730 may include a variable length session identification that if not empty identifies a prior session between the client and the server including prior security methods and parameters that the client wishes to reuse for the current session. The session identification may be from an earlier connection, this connection, or another currently active connection. The server may define the actual contents of the session identification. The session identification information 730 may be empty if a prior session is not available or if the client wishes to renegotiate security methods and parameters. According to one embodiment a session identification comprises an indication of a security conversion. For example, a session identification may correspond to a previously selected security conversion and receipt of the session identification allows a selection system to reselect the security conversion.

The supported cryptographic information 740 may include an indication of cryptographic options and combinations supported by the client and arranged according to the client's preference. This may also include similar information from prior sessions that are to be reused.

The compression method information 750 may include a list of compression algorithms or methods supported by the client and an indication of client preference for each method. If the session identification information 730 indicates a session to reuse, the compression method information 750 may include a compression method used for the prior session. According to one embodiment, the information 750 indicates support for CompressionMethod.null.

Figure 8:
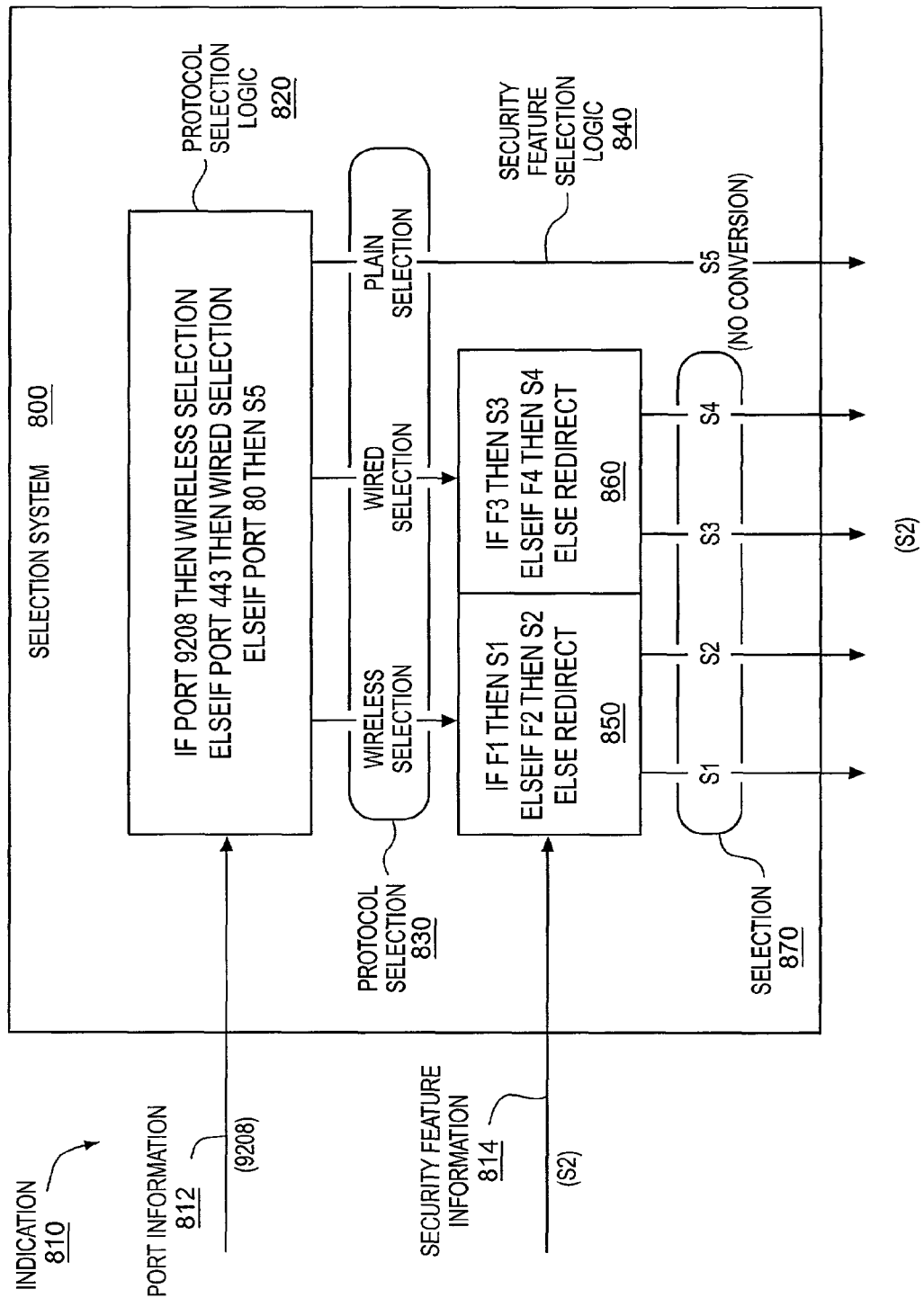
FIG. 8 shows security system, according to one embodiment.

FIG. 8 shows a selection system 800 of one embodiment. The selection system 800 receives an indication 810. The indication 810 is an indication sufficient to allow the selection system 800 to select a security format conversion. The shown indication 810 includes an indication of a security format and has port information 812 and security feature information 814.

The port information 812, which may include an indication of a port that data (e.g., client hello messages, security feature information, etc.) was received upon, is provided to protocol selection logic 820 of the selection system 800. The protocol selection logic 820 is operable to select between different security protocols based on the port information 812. According to the shown embodiment the protocol selection logic 820 is operable to select between a wireless protocol, a wired protocol, and a plain unsecured protocol based on the port information 812. Without limitation, consider the following conceptual protocol selection logic 820: if the port information 812 indicates port 9208 then select a wireless protocol; otherwise if the port information 812 indicates port 443 then select a wired protocol; otherwise if the port information 812 indicates port 80 then select a plain unsecured protocol. The protocol selection logic 820 asserts a protocol selection 830 that indicates either the wireless protocol (wireless selection), the wired protocol (wired selection), or the plain unsecured protocol (S5).

The selection system 800 also comprises security feature selection logic 840 coupled with protocol selection logic 820 to receive the protocol selection 830. The logic 840 is operable to select different security format conversions based on the protocol selection 830 and based on the security feature information 814. The selection S5 may bypass the logic 840 since a security format conversion will usually not be performed on plain data. According to the shown embodiment, the logic 840 is operable to select one of four different conversions (i.e., corresponding to selections S1, S2, S3, or S4), although this is not a limitation of other embodiments.

The logic 840 comprises a wireless logic portion 850 and a wired logic portion 860 both able to receive the security feature information 814. The logic portion 850 is operable to select a conversion if the protocol selection 830 indicates a wireless selection. Without limitation, consider the following conceptual logic portion 850: if the security feature information 814 indicates a set F1 of at least one security feature then select a first security format conversion; otherwise if the security feature information 814 indicates a set F2 of at least one security feature then select a second security format conversion; otherwise send a redirect URL if so configured.

The logic portion 860 is operable to select a conversion if the protocol selection 830 indicates a wired selection. Without limitation, consider the following conceptual logic portion 860: if the security feature information 814 indicates a set F3 of at least one security feature then select a third security format conversion; otherwise if the security feature information 814 indicates a set F4 of at least one security feature then select a fourth security format conversion; otherwise send a redirect URL if so configured.

The logic 840 asserts a security format conversion selection 870 that indicates a security format conversion to perform on secure data that is consistent with the port information 812 and the 814. The selection 870 may include S1 or S2 for a wireless device and S3 or S4 for a wired device. The selection 870 may be communicated to a conversion system or module.

Figure 9:
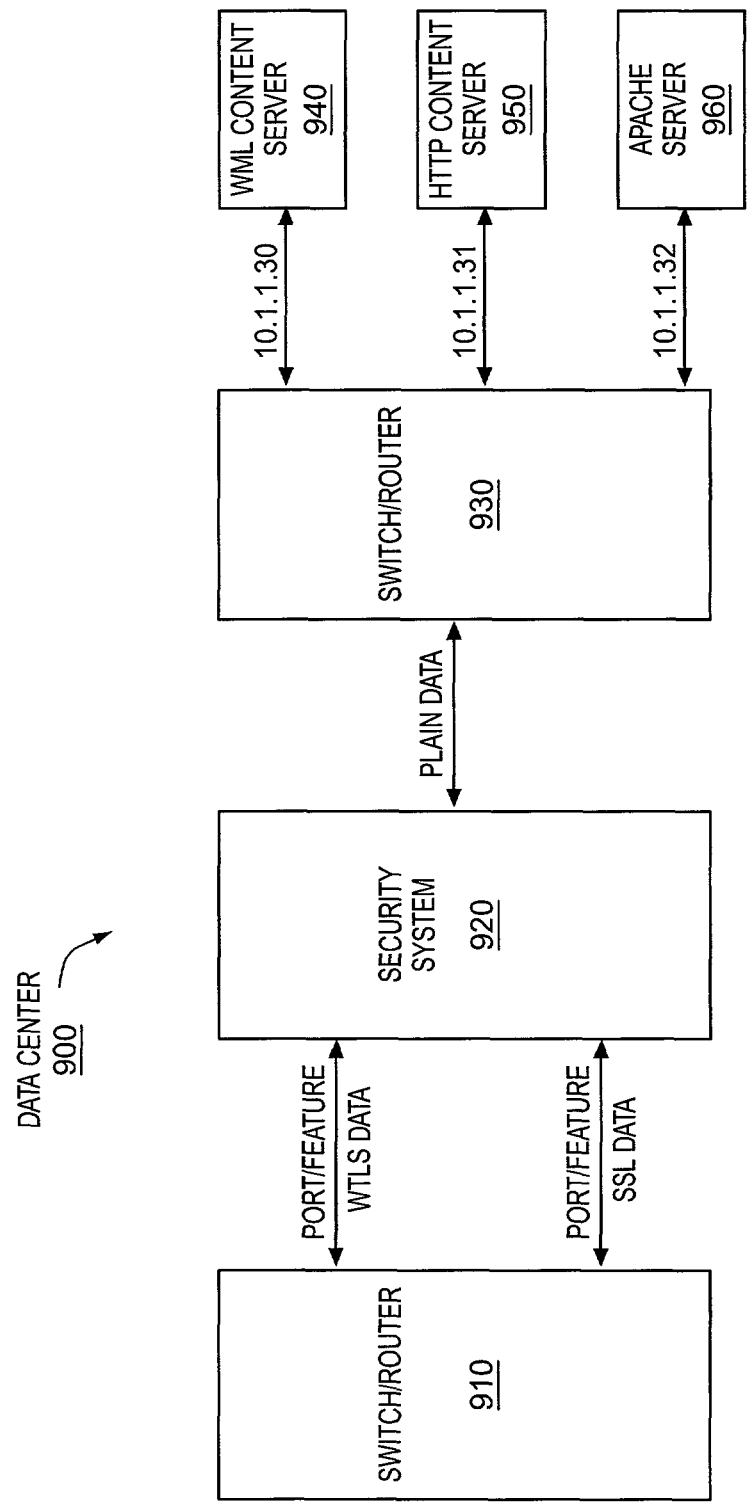
FIG. 9 shows architecture of a data center, according to one embodiment.

FIG. 9 shows a data center 900, according to one embodiment. The data center 900 may be coupled with a public network such as the Internet to receive indications and secure data from the public network. The data center 900 includes a security system 920 functionally disposed between a switch/router 910 and a switch/router 930 and sufficiently proximate to one or more servers 940-960 of the data center 900. The security system 920 receives potentially heterogeneously encrypted data from the switch/router 910 and provides appropriately security format converted data to the switch/router 930. The switch/router 930 provides the converted data, which may be in plain data format, to the one or more servers 940-960. According to a first embodiment the one or more servers 940-960 include a WML content server 940 that is reachable by an address 10.1.1.30 to receive and provide wireless data and an HTTP content server 950 that is reachable by an address 10.1.1.31 to receive and provide wired data. According to a second embodiment, an Apache server 960 reachable by an address 10.1.1.32 may receive and provide both wireless and wired data.

Figure 10:
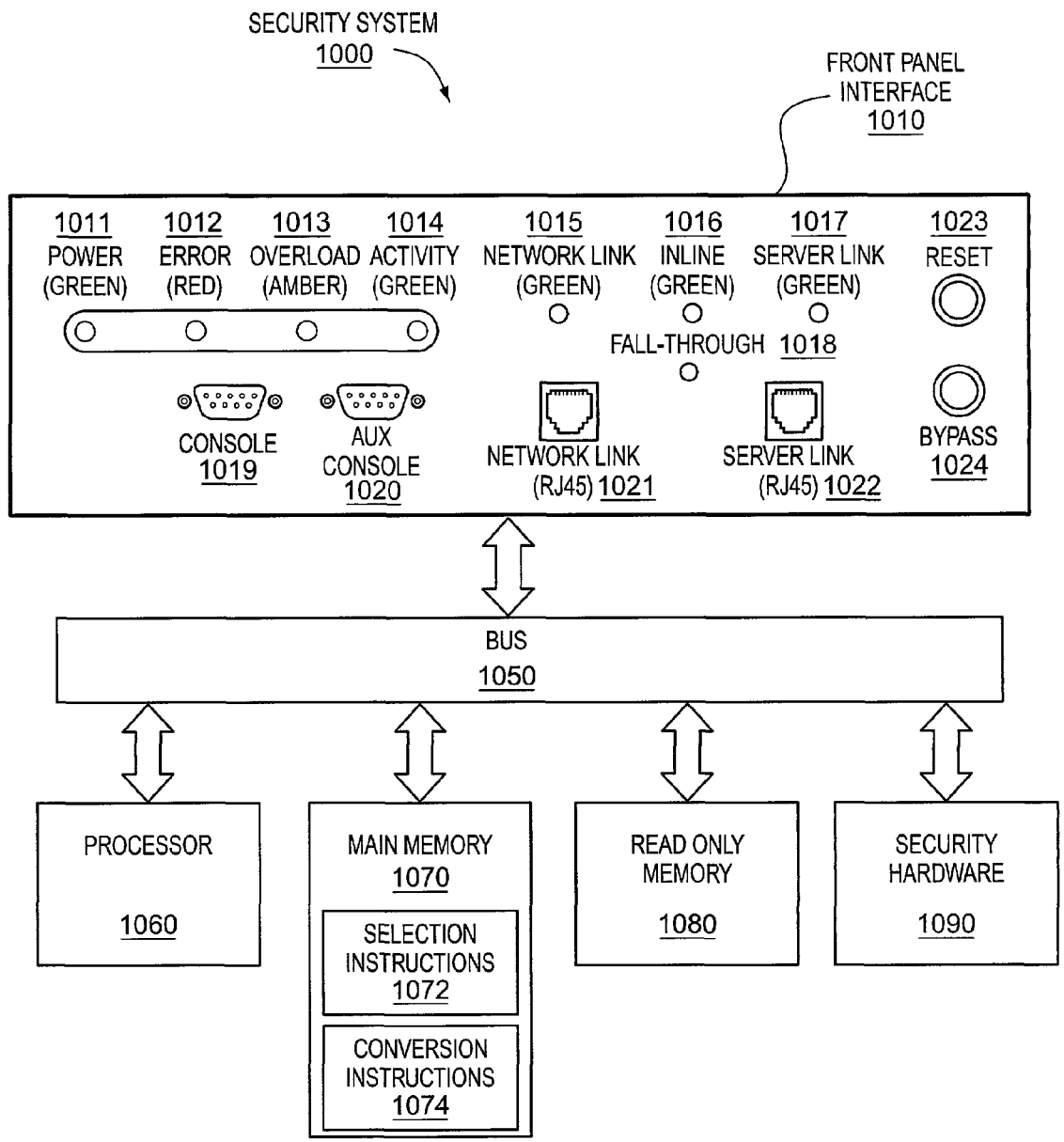
FIG. 10 shows a security system, according to one embodiment.

FIG. 10 shows a security system 1000, according to one embodiment. The security system 1000 includes a front panel interface 1010. The front panel interface may provide desired information (e.g., 1011-1018), data links (e.g., 1019-1022), and user controls (e.g., 1023-1024) that are desired for the particular implementation. In particular, the data links may include a link 1019 to a console including a display device (e.g., monitor), data entry device (e.g., keyboard), curser control device (e.g., mouse), and other components to allow the user to configure and monitor the system 1000. The data links may also include an network link 1021 to a public network or public network interface and a server link 1022 to a destination of security format converted data. These links may comprise gigabit Ethernet or RJ45 links.

The security system 1000 also includes a bus or other communication means 1050 coupled with the front panel interface 1010 to communicate information, a processing means such as a processor 1060 coupled with the bus 1050 to process data, a main memory 1070 (e.g., RAM memory) coupled with the bus 1050 to store data and instructions to be executed by the processor 1060, a read-only memory 1080 coupled with the bus 1050 to store static information and instructions for the processor 1060 (e.g., a BIOS), and security hardware 1090.

The main memory 1070 may store selection instructions 1072 and conversion instructions 1074. The instructions 1072, 1074 may be includes as applications, modules, data structures, or other logic.

According to one embodiment, security format conversion selection or security format conversion may be partially performed in hardware. For example, the hardware 1090 may comprise circuitry to perform modular exponentiation, pseudo random number generation, pseudo random key generation, DES/3DES encryption and decryption, and other desired security operations. According to one embodiment, the hardware 1090 comprises a crypto card, Field-Programmable Gate Array (FPGA), or Application Specific Integrated Circuit (ASIC) to perform such security operations.

Alternate Embodiments

The invention is not limited to the particular embodiments discussed above and those having an ordinary level of skill in the art and the benefit of the present disclosure will appreciate that many other embodiments are contemplated.

Different Security Formats

According to a first alternate embodiment, the invention may be used with other security formats than those previously described. The security format may be a format approved by the Internet Engineering Task Force (IETF), may be a format based on Transport Layer Security (TLS), may be a format that is a future enhancement of TLS, SSL, or WTLS, or may be a format such as Secure HTTP (S-HTTP), IP security (IPSec), Private Communications Technology, or others.

Distibuted Security System

According to a second alternate embodiment, the security system discussed herein may be distributed over multiple computer systems. For example, a first computer system or device may have a selection system, a second system or device may have a WTLS conversion system, and a third system or device may have an SSL conversion system.

Server With Security System

According to a third alternate embodiment, a security system, a selection system, or a conversion system may be incorporated into a server.

Web Switch

According to a fourth alternate embodiment, a security system, a selection system, or a conversion system may be incorporated into a Web switch having more network connection capabilities for increased connection scalability.

Push Mode

According to a fifth alternate embodiment, a security system, a selection system, or a conversion system may be used in a push mode. For example, a server in a data center may provide plain data to a security system that includes a security format conversion selection system to select conversion to SSL format for a wired device and conversion to WTLS format for a wireless device.

Authentication

Authentication is a security function and process by which a system validates users and computers that interact with the system. It is an assurance that can be implemented in addition to encryption. A device can be authenticated by using authentication information. This may include digital certificates, digital signatures, or both.

Throughout the description, authentication of a source shall refer to authentication of a user and/or a device. Also, authentication shall refer to verifying the identity of a client, and validation shall refer to processes that are typically executed in conjunction with the digital certificate process, including, but not limited to, verifying CA signatures, verifying the validity period of the certificates, and ensuring that the certificates do not exist on a certificate revocation list (CRL).

Furthermore, WAP (Wireless Application Protocol) standards shall be used to provide examples in the wireless device aspect of the invention. The WAP is a global standard for the presentation and delivery of wireless information and telephony services on mobile phones and other wireless terminals. From a security perspective, WTLS (Wireless Transport Layer Security), in particular, is described herein, which is a close relative of SSL (Secure Socket Layer), the protocol used to secure the wired internet.

Digital Certificates

One method for authenticating a device is through the use of digital certificates. A digital certificate is an assurance that data downloaded from the internet comes from a reputable source. Digital certificates ensure the legitimate online transfer of confidential information, money, or other sensitive materials by means of public encryption technology. A digital certificate is issued by a CA (certificate authority), and provides information such the time the digital certificate was issued, and its validity period.

A certificate can be compromised before it expires. For example, it can fall into the wrong hands, or the CA may decide that the source it was issued to is not trusted anymore. To reject certificates that are known to be compromised before expiration, the CA posts rejected certificates to a Certificate Revocation List (CRL). A CRL is a list of certificates that have been revoked by the CA before they expire, and is available on the public domain.

Digital Signatures

Digital signatures provide another method for authenticating devices. A digital signature serves to authenticate both the identity of a signer (i.e., source) and the integrity of the transmitted information through the use of public and private keys. The premise of digital signatures is that a signer of data has a private key, and others who exchange data with the signer can have the signer's public key. Others may use the public key to encrypt or decrypt the data, and the signer may use the private key to encrypt or decrypt data.

For example, a signer can sign a document by hashing the data to create a message digest, and then by encrypting the message digest with the signer's private key. The encrypted message digest is then appended to the document. When a recipient receives the encrypted message digest and document, the recipient uses the signer's public key to decrypt the encrypted message digest, generating the message digest. The document is then validated by hashing the data in the document and comparing it to the generated message digest. If they match, then the document has been validated. If they don't match, then the recipient knows that the data in the document has been tampered with since it did not produce the same message digest as that which was sent.

PKI/WPKI Infrastructures

In described embodiments of the invention are references to the PKI (Public Key Infrastructure) and WKPI (Wireless Public Key Infrastructure) systems of digital certificates, certificate authorities, and other registration authorities that verify and authenticate the validity of each party involved in an internet transaction. Under the PKI/WPKI infrastructure, generally, when a device requests a digital certificate (hereinafter "certificate"), it is approved by a registration authority, and then forwarded to a certificate authority. The certificate authority may then issue a certificate. Typically, the registration authority and the certificate authority comprise the same entity. In some cases, however, they may be different.

Overview

Figure 11:
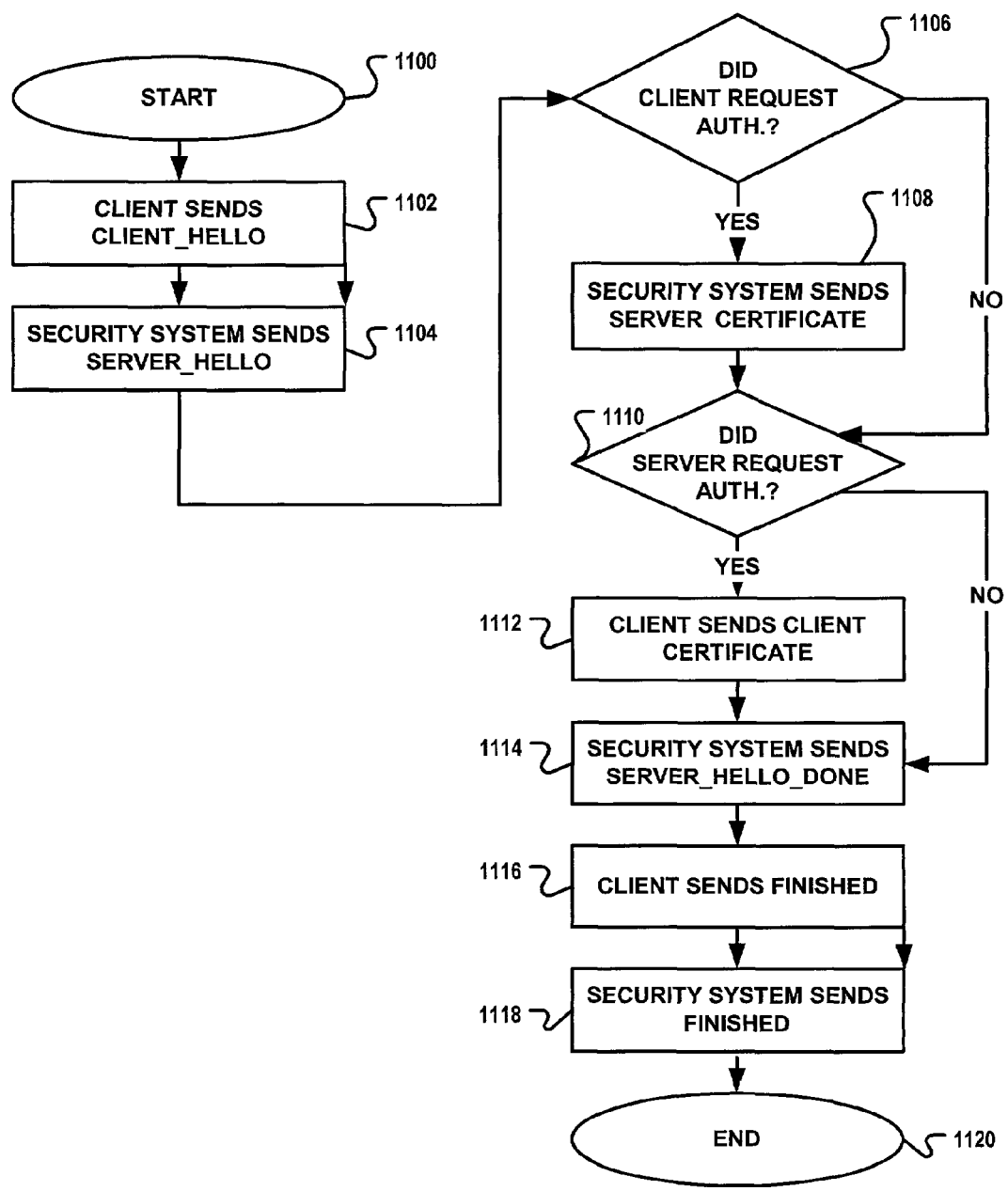
FIG. 11 is a flowchart illustrating a method for establishing a handshake between a client and a server in accordance with general embodiments of the invention.

FIG. 11 is a flowchart illustrating a method of establishing a secure connection in accordance with embodiments of the invention. The method starts at block 1100 and continues to block 1102 where a client sends a Client_Hello message to request a secure connection with a server. At block 1104, a security system responds with a Server_Hello message on behalf of the server, acknowledging the client's request. The security system then initiates a certificate exchange process in block 1106, where it is determined if the client has requested authentication (i.e., by asking for a secure connection). If the client has requested authentication, then at block 1108, the security system sends authentication information.

If the client does not request authentication, the method skips to block 1110 where the server may also request authentication (i.e., ask the client to identify itself). If the server requests authentication, then at block 1112 the client sends authentication information to the security system, and continues to block 1114. If the server does not request authentication, the method skips to block 1114 where the security system sends a Server_Hello_Done message to the client indicating that the hello-message phase of the handshake is complete. When the client receives the Server_Hello_Done message, it sends a Finished message to the security system at block 1116, and at block 1118, the security system responds with a Finished message. The method ends at block 1120.

The handshake is now complete and the client and server may send encrypted data to each other and/or if data has already been sent, then decryption can take place using a decryption method appropriate for the method in which the data was encrypted.

FIG. 12 is pseudocode illustrating the basic functionality as discussed above. The pseudocode begins at line 1, and at line 3, a method of encryption is detected. If the data is encrypted in WTLS (line 5), a WTLS handshake is initiated at line 6. At line 7, the WTLS authentication is completed, and at line 8, the WTLS data is decrypted.

If the data is encrypted in SSL (line 9), an SSL handshake is initiated at line 10. At line 11, the SSL authentication is completed, and at line 12, the SSL data is decrypted. If the data is not encrypted (line 13), then nothing is done to the data at line 14.

Figure 13:
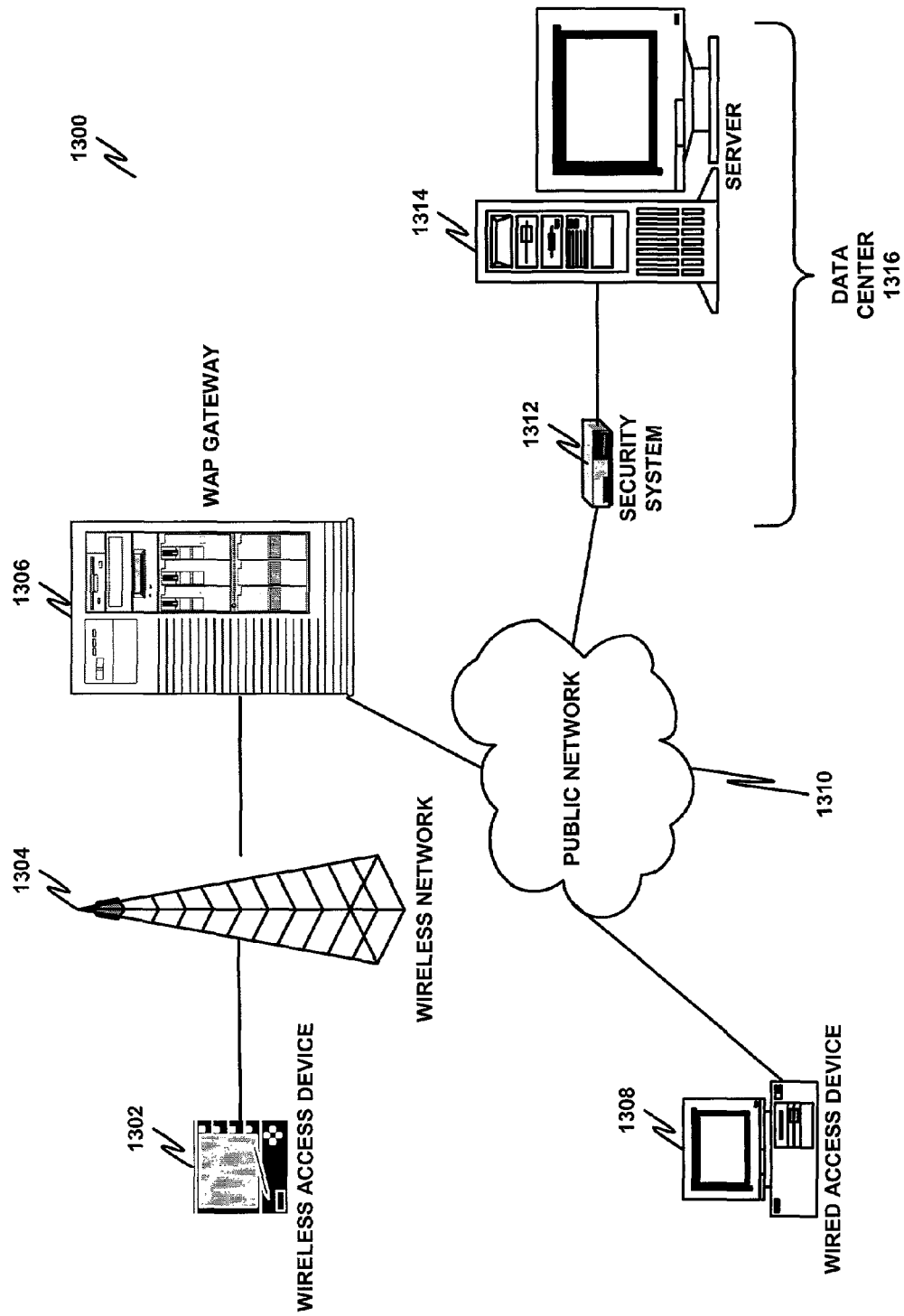
FIG. 13 illustrates a system architecture for wired and wireless authentication in accordance with general embodiments of the invention.

FIG. 13 illustrates a system architecture 1300 for wired and wireless authentication in accordance with general embodiments of the invention. It may comprise a wireless access device 1302 (such as a cell phone or a personal digital assistant) or a wired access device 1308 (such as a personal computer browser). In the case of a wireless access device 1302, WTLS data is sent through a wireless network 1304 using, for example, UDP (User Datagram Protocol) or WDP (Wireless Datagram Protocol) transport protocol. The wireless network 1304 receives the message and conveys it to the WAP gateway 1306, where the transport protocol is converted from WDP/UDP to TCP/IP, and where encoding and decoding take place.

Additionally, under the traditional approach, WTLS encrypted data is converted to SSL encrypted data at the WAP gateway, and the wireless client certificates are authenticated at the WAP gateway. However, this is not an end-to-end solution for authentication. In embodiments of the invention, however, decryption does not take place at the WAP gateway. Instead, the WTLS data is transmitted to a data center 1316 via a public network 1310, such as the Internet. In the case of a wired access device 1308, SSL data is sent to the data center 1316 directly via the public network 1310.

At the data center 1316, the sender of the data (i.e., the client) is authenticated, the WTLS/SSL encrypted data is decrypted to plain text, and the plain text data is sent to one of many possible servers 1314 (only one shown) in the data center. The data center 1316 may comprise a security system 1312 much like the security system 345 of FIG. 3.

The architecture 1300 illustrated in FIG. 13 resembles the architecture 300 illustrated in FIG. 3 in many aspects, except that the security system of FIG. 13 additionally has an authentication system over the security system 345 of FIG. 3.

Figure 14:
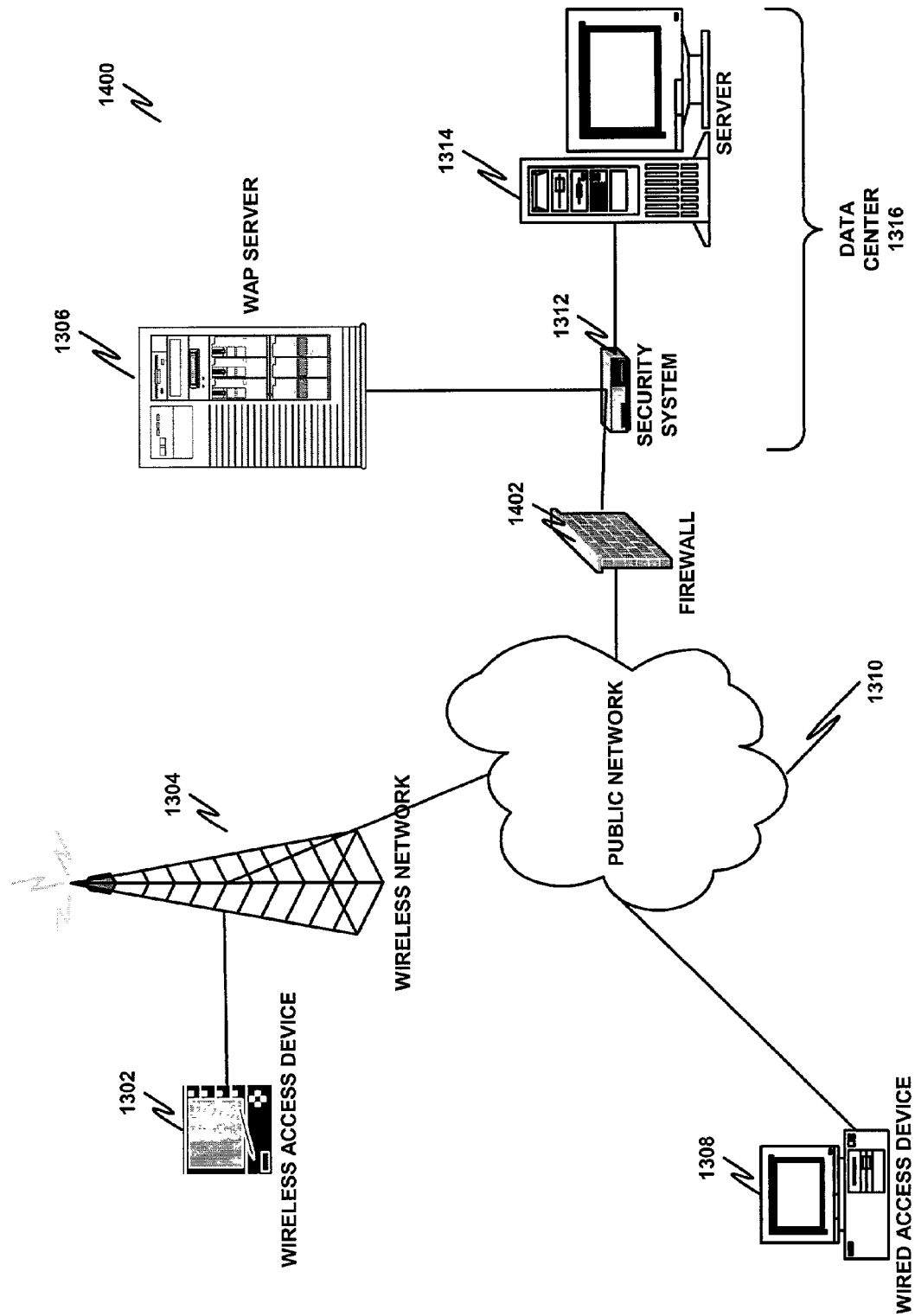
FIG. 14 illustrates an alternative system architecture for wired and wireless authentication in accordance with general embodiments of the invention.

In an alternative embodiment, as illustrated in FIG. 14, the system architecture 1400 includes a security system 1312 that resides in front of the WAP server 1306 that performs WAP gateway and web server functionality. Alternatively, the security system 1312 may reside in front of a WAP gateway that is followed by web servers (not shown). This embodiment may include a firewall 1402. For instance, some companies may operate their own gateway in their data center for their applications, and thus do not rely on mobile service providers for the gateway service.

In this embodiment, WTLS data is sent from a wireless device 1302 to a wireless network 1304 using, for example, UDP (User Datagram Protocol) or WDP (Wireless Datagram Protocol) transport protocol. The wireless network 1304 receives the message, and routes the data through the public network 1310, and then through the firewall 1402.

Once the data is received at the security system 1312, the security system 1312 authenticates WTLS encrypted data and, if applicable, converts the WTLS encrypted data to plain text. The security system 1312 then takes care of authentication and decryption. In the case of a wired access device 1308, SSL data is sent to the data center 1316 via the public network 1310, where the security system 1312 authenticates the SSL encrypted data and, if applicable, converts the SSL encrypted data to plain text. The plain text data can then sent to one of many possible servers 1314 (only one shown) in the data center.

The security system 1312 maintains a CRL that is updated at predefined intervals from a publicly accessible CRL that is updated by the CA. The security system updates its CRL from the publicly accessible CRL, and comprises an authentication system to determine if the client side certificates it receives from client devices are valid by comparing them to its CRL.

The security system 1312 also requests server side certificates to send to clients, such as when clients request authentication. The security system 1312 maintains regular certificates for sending to wired devices, as well as long-lived and short-lived certificates for sending to wireless clients. Wired devices may authenticate the identity of a server by checking server certificates against a CRL maintained by the wired device.

In the case of wireless clients, since wireless devices do not have the local resources or the communication bandwidth to implement revocation methods, such as a CRL, servers are authenticated once in a long-term period (i.e., issued a long-lived certificate), and servers are issued short-term certificates throughout the long-term period that can be issued to clients. The servers, in turn, send both a long-lived certificate and a short-lived certificate to the client, which must both be valid for the client to authenticate the server.

If the CA wishes to revoke the server, it simply ceases issuing further short-lived certificates to the server. Consequently, if the short-lived certificate is not valid, the client will no longer be presented with a currently valid certificate, and so will cease to consider the server authenticated. This alleviates the need for the client to maintain a CRL to compare server side certificates against.

Server Side Certificate Support

Server authentication allows clients to use server certificates to authenticate servers, and only allows servers with valid server certificates to connect with a client. Server certificates are issued by a CA (such as VeriSign of Mountain View, Calif.), which checks whether a server certificate applicant meets the CA's criteria for trustworthiness before issuing the server certificate. The server certificate allows a server to connect with a client until the validity of the server certificate expires. After expiration, the server will be blocked. To renew access, the server's trustworthiness must be reaffirmed by the CA.

However, a server certificate may be compromised before it expires. Wired devices may maintain a CRL for authenticating servers, while wireless devices are issued short-lived certificates, supra.

Figure 15:
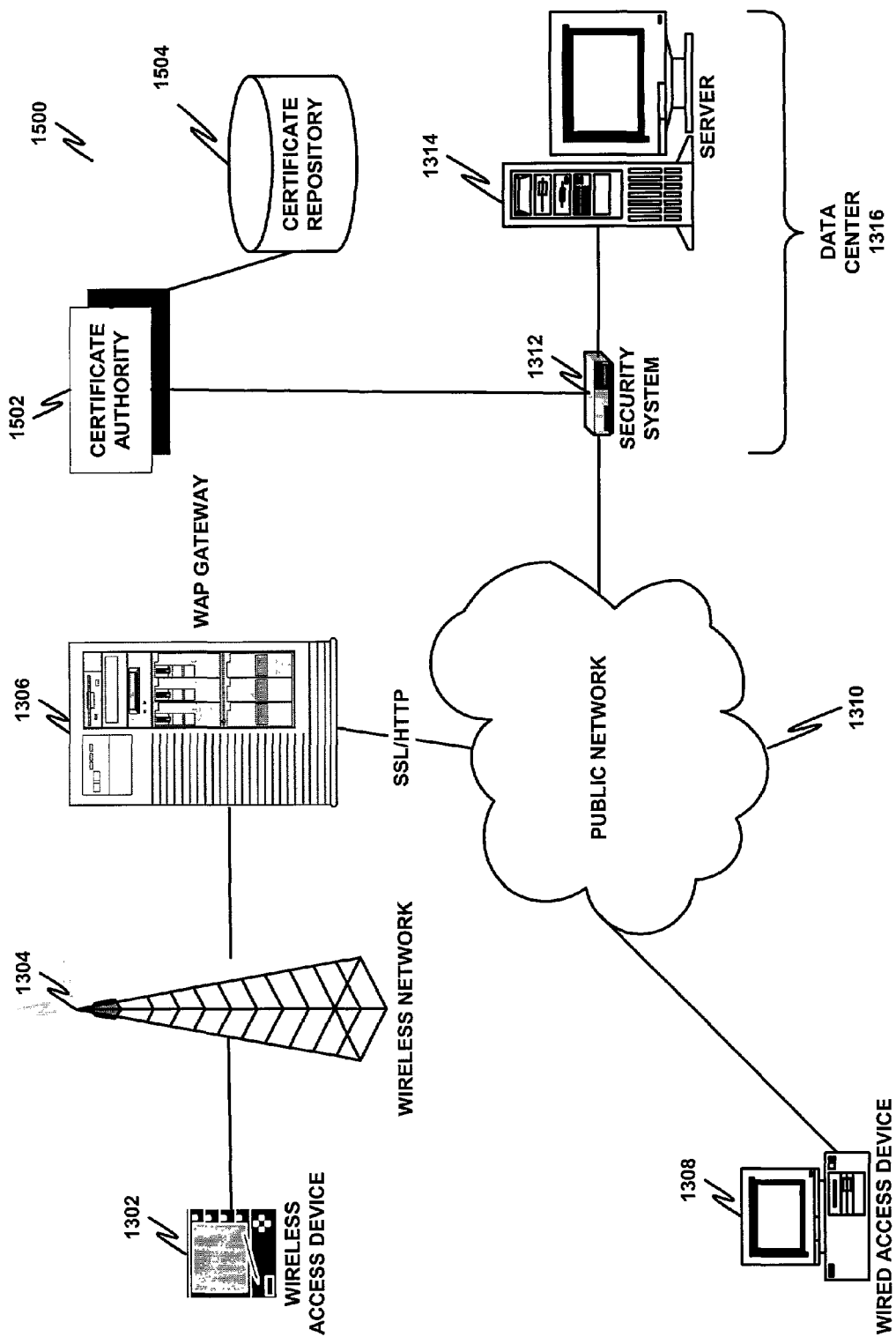
FIG. 15 is a diagram illustrating an operational flow for server side certificates for both wired and wireless clients.

FIG. 15 is a diagram illustrating an operational flow 1500 for server side certificates for both wired and wireless clients. A security system 1312 requests server certificates from a certificate authority 1502, and the certificate authority posts it to a certificate repository 1504, where certificate information (including certificate numbers, and who they were issued to) is maintained.

A client 1302, 1308 may connect to a server 1312 in the data center 1316 via the security system 1312. A wireless access device 1302 attempts a secure connection (which is an implicit request for authentication, sometimes referred to as a "request for authentication") with the server by transmitting a WTLS message to a wireless network 1304. The wireless network 1304 transmits the message to a WAP gateway 1306, whereas a wired access device 1308 may connect directly through the public network 1310. The WAP gateway 1306 then transmits the encrypted client message to the security system 1312 via a public network 1310. In response to the client's request for authentication, the security system 1312 sends a server certificate to the client 1302, 1308. The client 1302, 1308 may then authenticate the server certificate.

Figure 16:
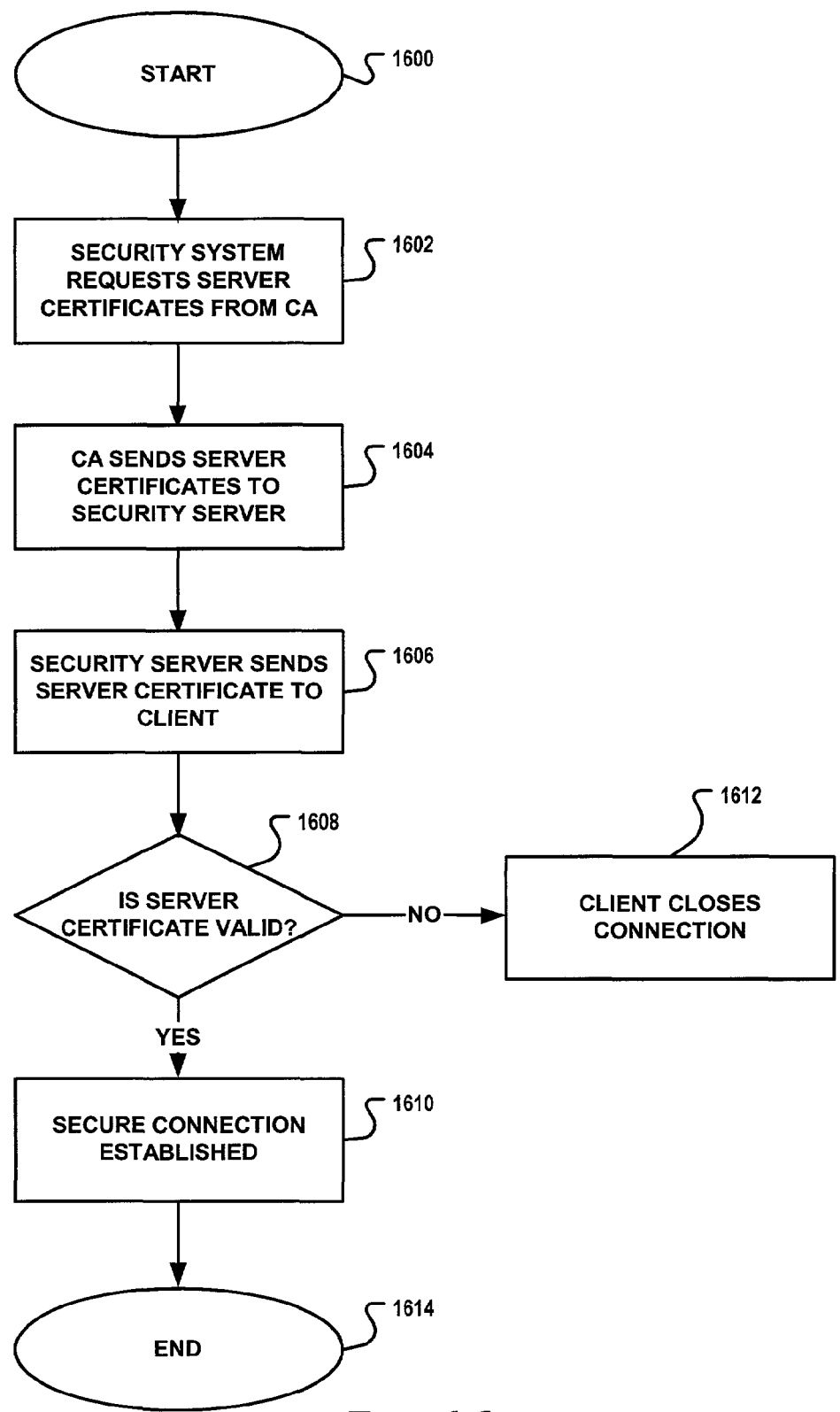
FIG. 16 is a flowchart illustrating a method for server side certificates in accordance with general embodiments of the invention.

FIG. 16 is a flowchart illustrating a method for server side certificates in accordance with general embodiments of the invention. The method begins at block 1600, and continues to block 1602 where a security system requests server certificates from a CA, and the CA sends the certificates to the security system at block 1604. At block 1606, the security system sends a server certificate to a client, such as in response to a client requesting authentication. At block 1608, it is determined if the server certificate is valid. At block 1610, a secure connection is established if the server certificate valid. Otherwise, the client closes the connection at block 1612. The method ends at block 1614.

The security system may poll the certificate repository at user-defined intervals to obtain certificates, update short-lived and long-lived certificates, and/or to update its CRL.

Wireless Client

In the wireless internet, a WTLS server certificate is a certificate that authenticates the identity of a server to a wireless device. When a wireless device user wants to send confidential information to a server, the WAP device will request the server's digital certificate. The certificate, which contains the WAP server's public key, is used by the wireless device to:
  authenticate the identity of the server; and
  encrypt information for the server using the WTLS protocol.

The WPKI architecture, however, involves a different implementation since it is difficult for a WAP device to continuously update the CRL list to check for revocation of server side certificates. In the WPKI architecture, the security system maintains short-lived certificates and long-lived certificates. Request intervals can be user-defined.

Figure 17:
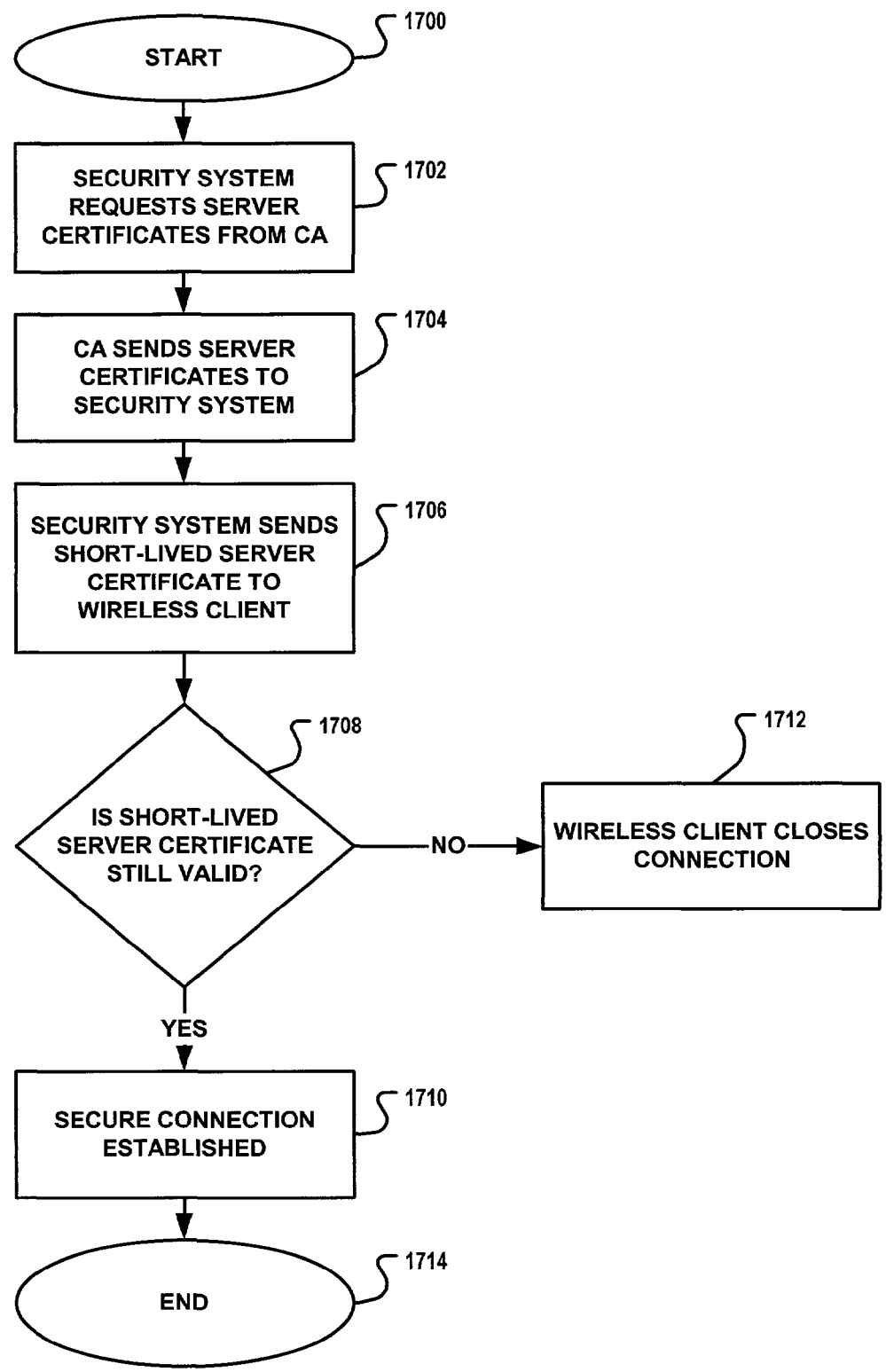
FIG. 17 is a flowchart illustrating a method for server side certificates for wireless clients.

FIG. 17 is a flowchart illustrating a method for server side certificates for wireless clients in accordance with embodiments of the invention. The method starts at block 1700, and continues to block 1702 where a security system requests server certificates (including the download and update of short-lived and long-lived certificates) from a CA on behalf of the server. Since server certificates may be requested in accordance with user-defined intervals, this step may not necessarily occur everytime.

At block 1704, the CA sends server certificates to the security system. At block 1706, both a long-lived and a short-lived certificate are sent to the client. For instance, the server certificate may be sent to the client in response to a client request for authentication.

At block 1708, it is determined if the server certificates are valid by verifying the CA signature, and the validity period of the certificate. If both long-lived and short-lived certificates are still valid, then a secure connection is established at block 1710. Otherwise, the client may close the connection at block 1712. The method ends at block 1714.

Wired Client

Likewise, in the wired internet, an SSL certificate is a certificate that authenticates the identity of a server to a wired device (i.e., personal computer).

To reject server certificates which are known to be compromised before expiration, a client consults a Certificate Revocation List (CRL) which is maintained in a public domain, but which may be downloaded to the client. Typically, the client will close the connection if the server certificate is found in the CRL.

Figure 18:
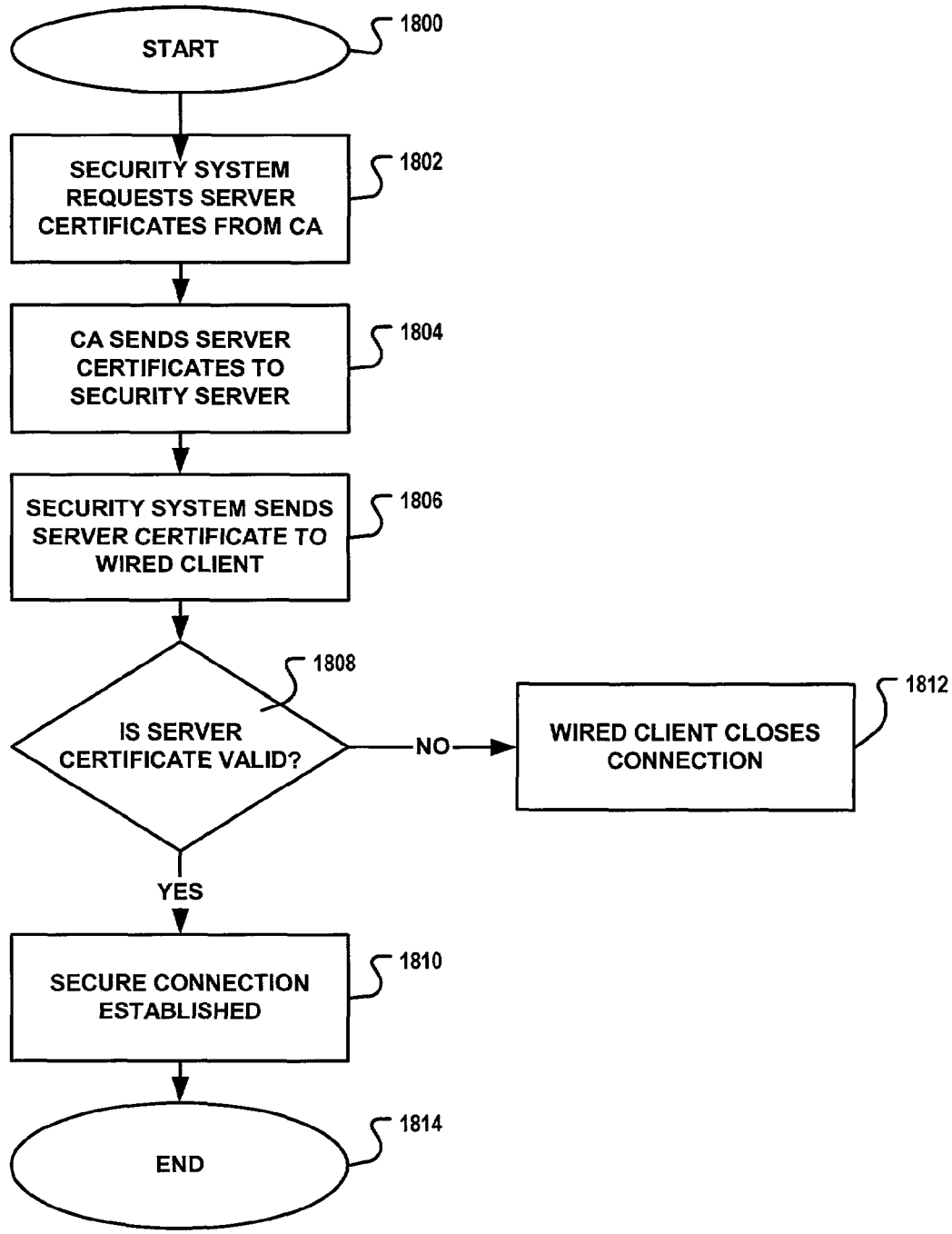
FIG. 18 is a flowchart illustrating a method for server side certificates for wired clients.

FIG. 18 is a flowchart illustrating a method for server side certificates for wired clients in accordance with embodiments of the invention. The method starts at block 1800, and continues to block 1802 where a security system requests server certificates from a CA on behalf of the server. The CA sends server certificates to the security system at block 1804. At block 1806, a server certificate is sent to the client. For instance, the server certificate may be sent to the client in response to a client request for authentication.

At block 1808 the client verifies the server certificate by determining if the server certificate is on the CRL. If the server certificate is not on the CRL, then at block 1810, a secure connection between the client and the server is established. Otherwise, at block 1812, the client closes the connection. The method ends at block 1814.

Client Side Certificate Support

Client authentication may use client certificates installed in users' web browsers or other client applications to authenticate users, and only allows clients with valid client certificates into an authorization realm (i.e., a restricted area on a web site, for example). A client certificate is issued by a Certificate Authority (CA). A CA checks whether a client certificate applicant meets the CA's criteria for trustworthiness before issuing the client certificate. The client certificate is good for access to the authentication realm until its validity expires. After expiration, the user will be blocked. To renew access, the user's trustworthiness must be reaffirmed by the CA before renewal of the client certificate. The checking of when client certificates are issued and renewed helps to ensure that valid client certificates are only in the hands of users trusted to get into an authorization realm.

However, a client certificate can be compromised before it expires. For example, it can fall into the wrong hands, or the CA may decide that the user it was issued to is not trusted anymore. If a client certificate is compromised before it expires, the CA can revoke it by adding the revoked client certificate to a certificate revocation list (CRL). The CRL is maintained by the CA, but can be downloaded to servers for authenticating the identity of clients.

To reject client certificates which are known to be compromised before expiration, a server consults a Certificate Revocation List (CRL) which is maintained in a public domain, but which may be downloaded to the servers. Clients with revoked client certificates will be denied access to an authorization realm if the revoked client certificates are in the CRL.

In embodiments of the invention, the security system 1312 supports a CRL. The security system 1312 downloads the CRL from the public domain. When a client certificate is received in response to a server's request for authentication, the client certificate is checked against the server's CRL to determine if it has been revoked.

In embodiments of the invention, authentication via client side certificates may be enabled or disabled by the security system on behalf of the server. For example, authentication may be enabled for transactions such as placing stock quote orders, but disabled for transactions such as serving plain web pages.

Figure 19:
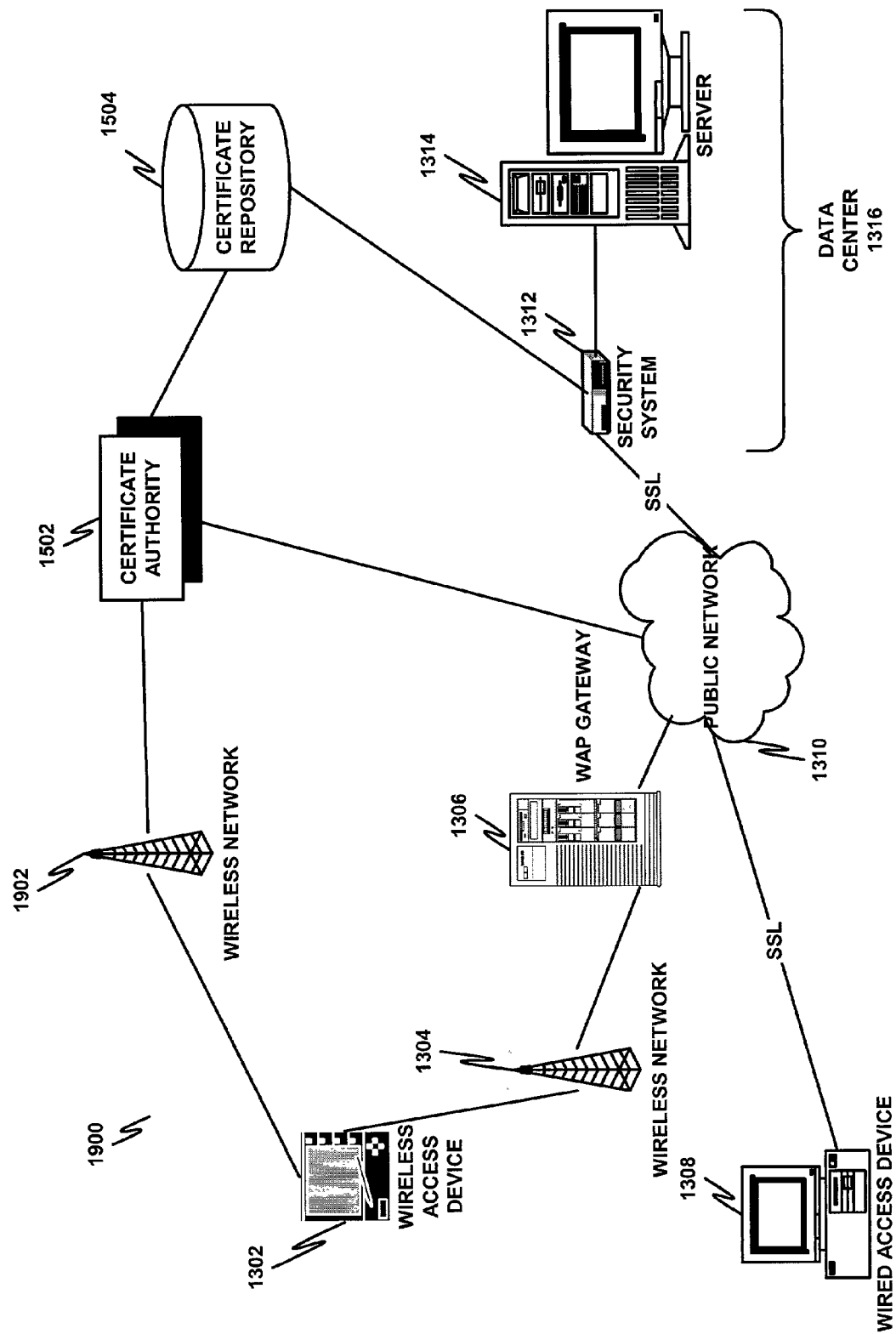
FIG. 19 is a diagram illustrating an operational flow for client side certificates for both wired and wireless clients.

FIG. 19 is a diagram illustrating an operational flow 1900 for client side certificates for both wired and wireless clients. A wireless client 1302 applies for a certificate by connecting to a CA 1504 via a wireless network 1902. The CA 1502 issues the certificate and posts it to the certificate repository 1504. The CA 1502 then sends a client certificate, or a certificate URL to the client, and the client 1302 may attempt to connect to the server 1314 using a WTLS message and the client certificate, or a link to the client certificate.

The security system 1312 updates its CRL at user-defined intervals. It decrypts the WTLS message and checks for a valid client certificate by comparing it against the CRL. If the client certificate is valid, then a secure connection is established. Otherwise, the server may chose to close the connection, or allow the connection but deny the client access to an authorization realm, for example.

For the wired client 1308, a client certificate is requested from the certificate authority 1502 via the public network 1310 (i.e., internet). A wired client 1308 may attempt to connect to the server 1314 by sending an SSL message and a client certificate. If the client certificate is valid, then a secure connection is established. Otherwise, the server may chose to close the connection, or allow the connection but deny the client access to an authorization realm, for example.

Figure 20:
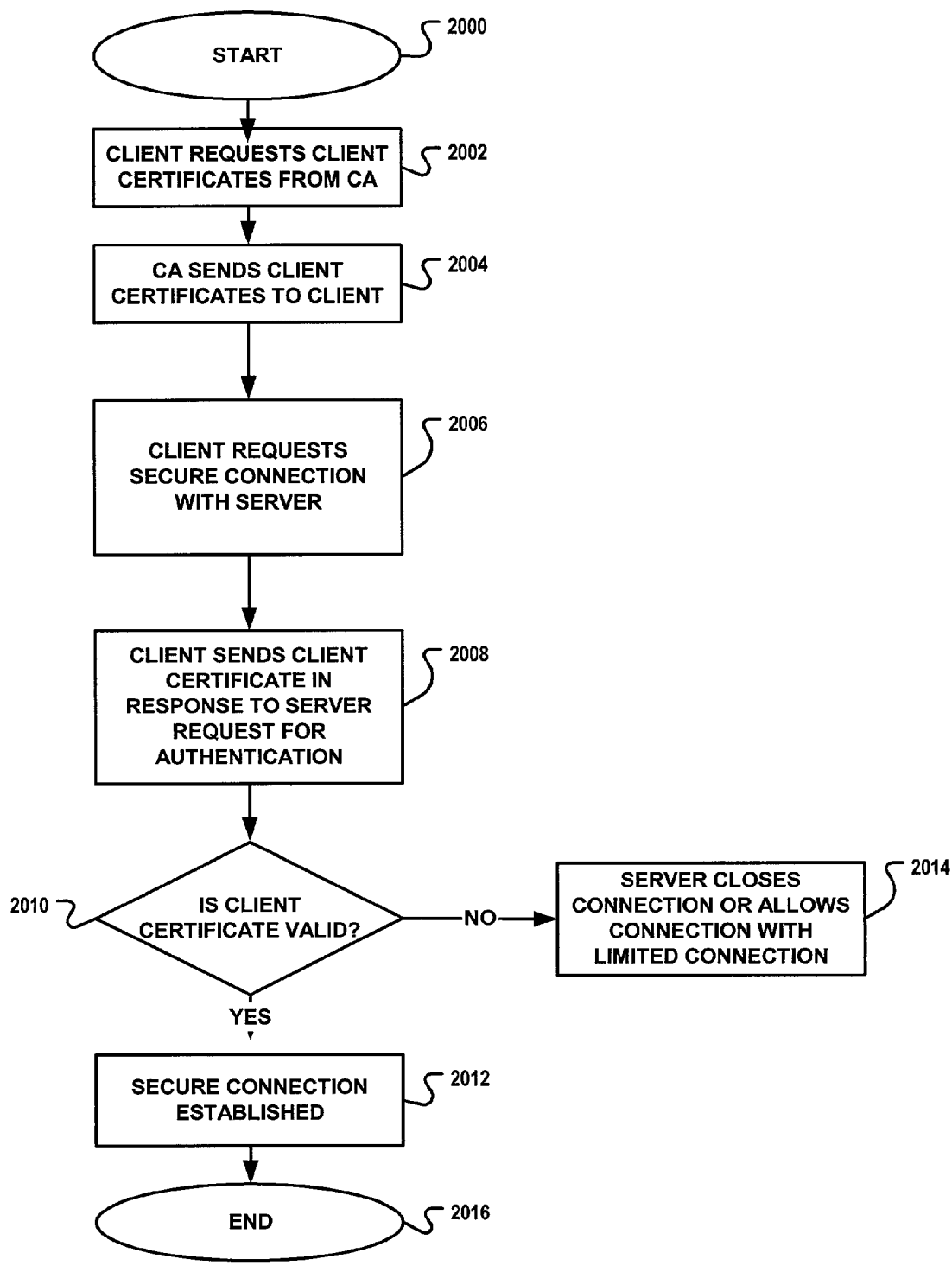
FIG. 20 is a flowchart illustrating a method for client side certificates in accordance with general embodiments of the invention.

FIG. 20 is a flowchart illustrating a method for wired client certificates in accordance with general embodiments of the invention. It starts at block 2000, and continues to block 2002 where a client applies for wired client certificates. At block 2004, a certificate authority issues wired client certificates to the client. At block 2006, the client may request a secure connection without the wired client certificate, and the wired client certificate is sent to the server in response to the server's request for client authentication at block 2008.

A security system validates the wired client certificate on behalf of the server at block 2010. If it is valid, then a secure connection is established at block 2012. Otherwise, no secure connection is established at block 2014, and the server may choose to close the connection, or allow the connection but deny the client access to the authorization realm, for example. The method ends at block 2016.

Wireless Clients

In the wireless internet, a WTLS client certificate is used to authenticate a wireless device to a server. As one example, WTLS client certificates are defined as part of WAP 1.2 and formatted as either X.509 certificates or mini-certificates, for example.

Figure 21:
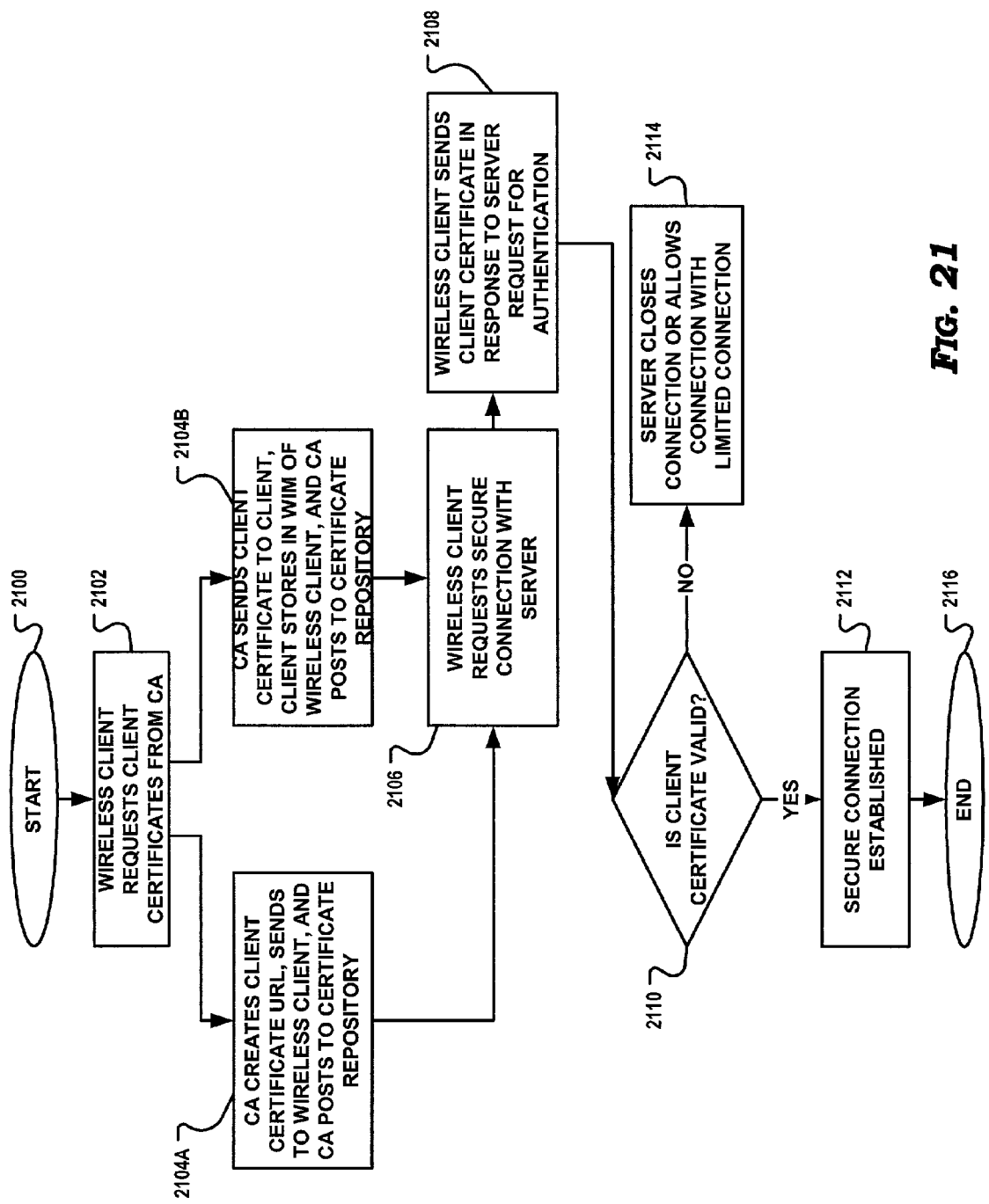
FIG. 21 is a flowchart illustrating a method for client side certificates for wireless clients.

FIG. 21 is a flowchart illustrating a method for wireless client side certificates in accordance with embodiments of the invention. The method begins at block 2100, and continues to block 2102, where a client applies for a wireless client certificate. At block 2104A, the CA creates a URL (Uniform Resource Locator) to the wireless client certificate and sends the certificate URL to the client. Alternatively, a wireless client certificate issued by the CA may be sent to the client and stored in a Wireless Identity Module (WIM) in the WAP device 2104B. WIM is used for performing WTLS and application level security functions and to store and process information needed for user identification and authentication.

The client may attempt a secure connection at 2106, and subsequently send the client certificate (or link to it) in response to the server's request for authentication at 2108. The security system decrypts the WTLS message and compares the client certificate against a CRL at block 2110 to determine if the client certificate is authentic. If the client certificate is valid, then at block 2112, a secure connection between the client and the server is established. Otherwise, no secure connection is established at block 2114, and the server may choose to close the connection or allow the connection without allowing the client in the authorization realm. The method ends at block 2116.

Wired Clients

Figure 22:
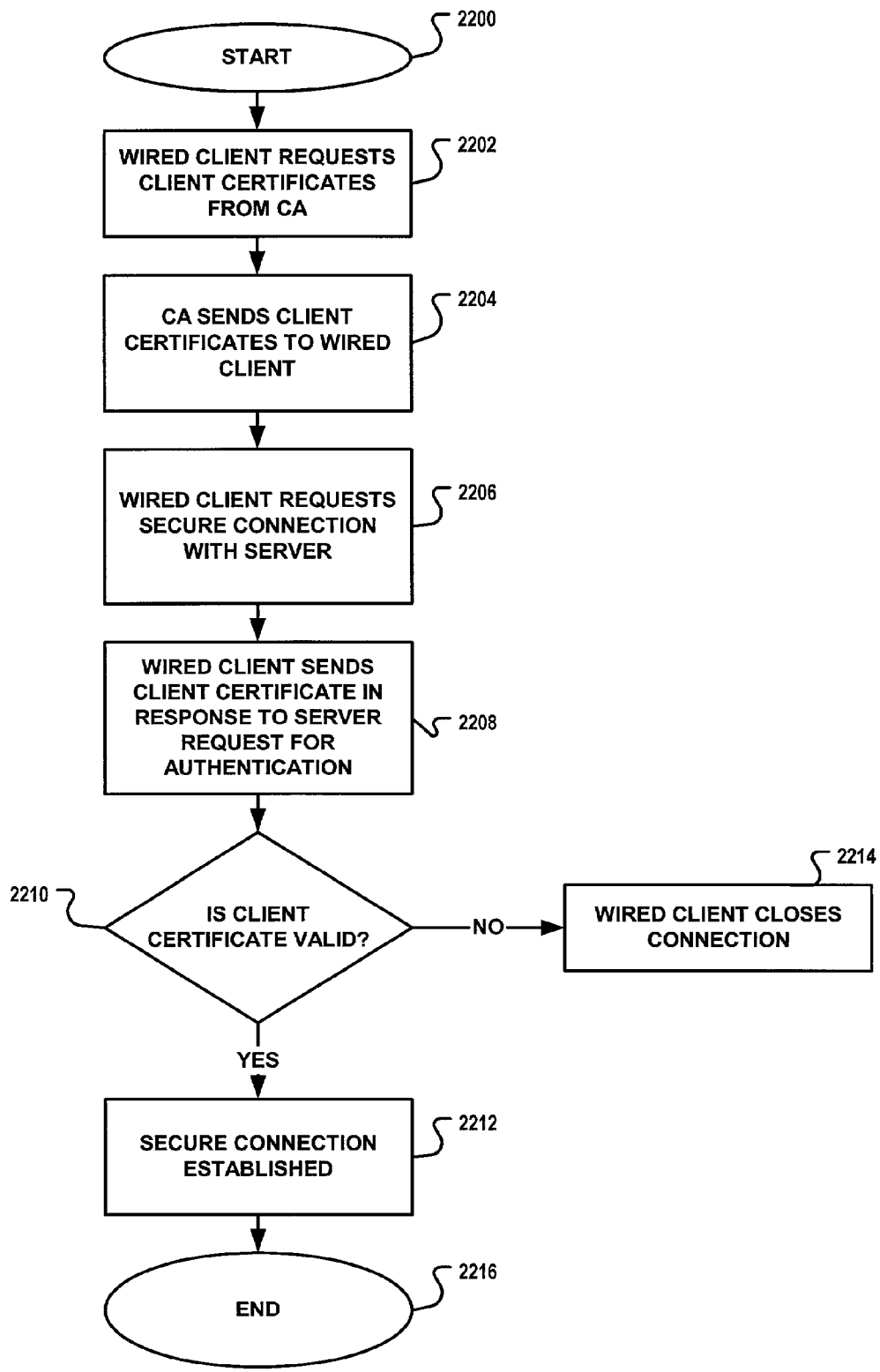
FIG. 22 is a flowchart illustrating a method for client side certificates for wired clients.

In the wired internet, an SSL client certificate is a client certificate that authenticates the identity of a wired device to a server. FIG. 22 is a flowchart illustrating a method for wired client side certificates in accordance with embodiments of the invention.

The method begins at block 2200, and continues to block 2202 where a client applies for a wired client certificate. At block 2204, the CA issues the certificate and sends it to the client. At block 2206, the client attempts a secure connection with the server, and subsequently sends the wired client certificate in response to the server's request for authentication at block 2208.

At block 2208 the security system decrypts the SSL message and compares the client certificate against a CRL to determine if the client certificate is authentic. If the client certificate is valid, then at block 2212, a secure connection between the client and the server is established. Otherwise, no secure connection is established at block 2214, and the server may choose to close the connection or allow the connection without allowing the client in the authorization realm. The method ends at block 2216.

Digital Signatures

In addition to sending a client certificate, a client may send a digital signature. If a client sends a digital signature, then it is verified by the server. If the digital signature is valid, then a secure connection is established. Otherwise, the client is denied access to the authorization realm.

For the wireless client, for example, digital signatures may be implemented using available WAP functionality. WAP 1.2 also defines a WPKI-based function that is not part of WTLS. This function, which allows a WAP client to digitally sign a transaction, is known as the Wireless Markup Language (WML) Script Sign Text Function, and is intended for applications that require non-reputable signatures from clients.

Security System

Figure 23:
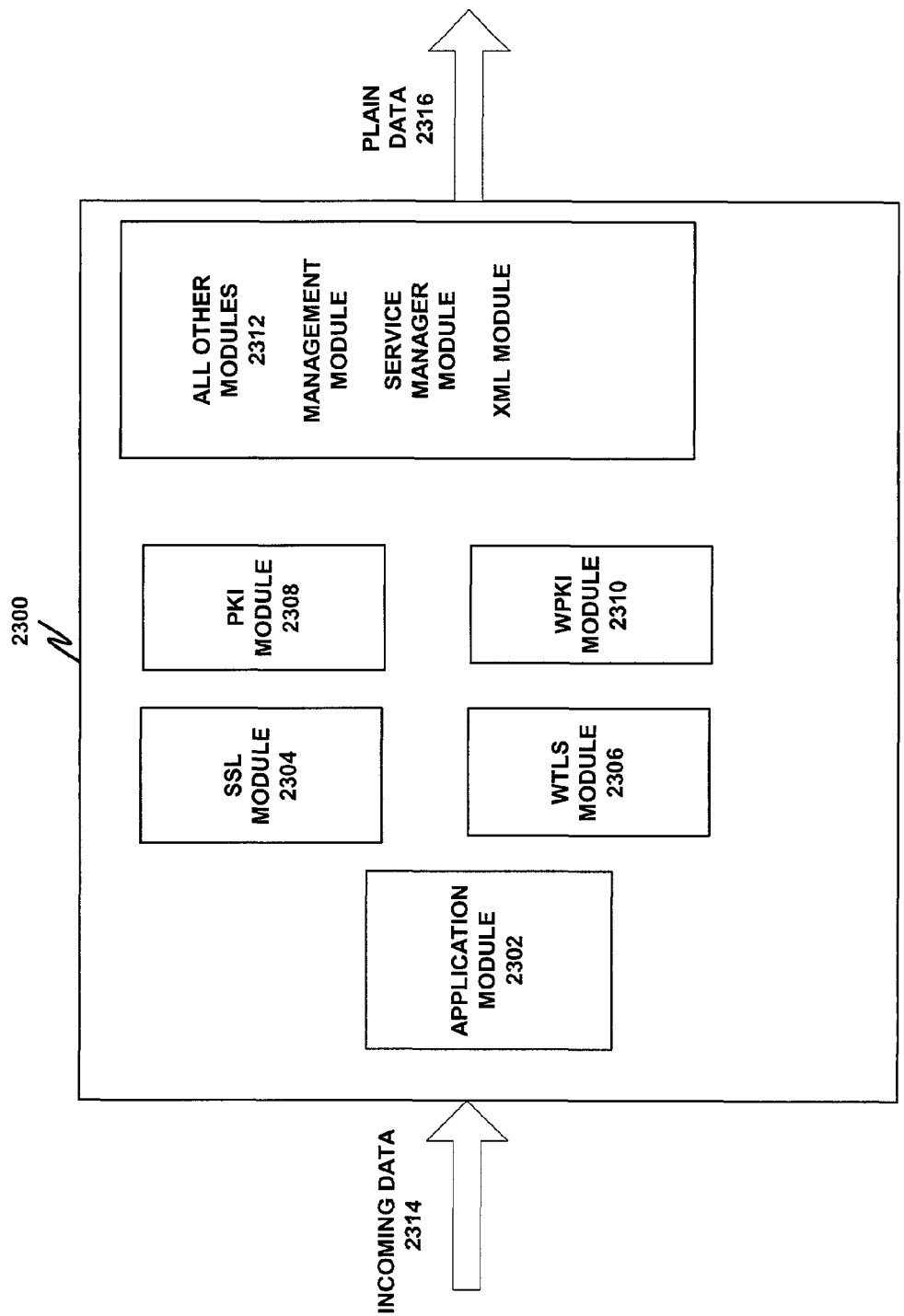
FIG. 23 is a diagram illustrating a security system in accordance with general embodiments of the invention.

FIG. 23 illustrates an architecture for the security system. The security system 2300 comprises an application module 2302; SSL module 2304; PKI module 2308; WTLS module 2306; and WPKI module 2310. The input to the security system comprises incoming data 2314, which may be SSL encrypted data, WTLS encrypted data, or plain data. The output of the security system is plain data 2316, which can then be processed by a server.

The application module 2302 detects whether the incoming data 2314 is SSL encrypted, WTLS encrypted, or plain text. It then handles the WTLS/SSL handshake on behalf of the servers behind it, and interacts with PKI/WPKI modules for the server and client side authentication.

If the incoming data 2314 is SSL encrypted and authentication has been established, the application module calls the SSL module 2304. The SSL module 2304 reads the data and decrypts it to plain text 2316. When it completes its process, it informs the application module 2302. The SSL module 2304 may use a hardware crypto card for SSL functions and to provide SSL acceleration. The SSL module may comprise the SSL conversion system 374 of FIG. 3. In general embodiments of the invention, the SSL module 2304 may be a wired device decryption module that accepts data encrypted using a wired security protocol (i.e., data that is SSL encrypted), and that decrypts such data to plain text.

The WTLS module 2306 is called if the application module 2302 detects WTLS encrypted data and authentication has been established. The WTLS module 2306 reads the incoming data 2314 and decrypts it to plain text 2316. It informs the application module 2302 when it is complete. The WTLS module 2306 can either be purely software or a combination of software and hardware. The WTLS encryption and decryption can be accelerated by performing the processor intensive functions in the hardware. The WTLS module may comprise the WTLS conversion module 372 of FIG. 3. In general embodiments of the invention, the WTLS module 2306 may be a wireless device decryption module that accepts data encrypted using a wireless security protocol (i.e., data that is WTLS encrypted), and that decrypts such data to plain text.

The PKI module 2308 has the functionality for verification of digital signatures and/or for the authentication of wired client certificates by checking its CRL for any client certificates that have been revoked by the CA. The CRL list is updated according to user-defined intervals using a LDAP/FTP/HTTP request to the LDAP server. The PKI module 2308 also supports authentication of the server by downloading server side certificates from a CA and issuing them to clients. In general embodiments of the invention, the PKI module 2308 may be a wired device authentication module that accepts wired authentication information, and that authenticates the wired device using the wired authentication information.

The WPKI module 2310 has the functionality for verifying wireless digital signatures, and/or for authenticating wireless client certificates by checking its CRL for any client certificates that have been revoked by the CA. The CRL list is updated according to user-defined intervals using a LDAP (Lightweight Directory Access Protocol)/FTP (File Transfer Protocol)/HTTP (HyperText Transfer Protocol) request to the LDAP server. In general embodiments of the invention, the WPKI module 2310 may be a wireless device authentication module that accepts wireless authentication information, and that authenticates the wireless device using the authentication information.

The WPKI module 2310 also supports authentication of the server using server side certificates. There are two types of server side certificates handled by this module. Short-lived certificates can be set to expire every 24 hours and long-lived certificates can be set to expire in a year. They are updated, i.e., downloaded from a CA, in accordance with user-defined intervals.

Other Modules

Once the application gets the plain text 2314 from the SSL 2304 or WTLS module 2306, it can call up other modules 2312 like XML processing module, load balancing module, or XML transformation module, for example, to provide other functionalities on the network device. It can be combined with features like content based switching, XML based routing, and device detection.

Configuration

FIG. 24 is an example of how a security system can be configured. Field definitions are as follows:

the map ID field provides an arbitrary identifier for a connection;

the connection type field provides a type of the connection, for example, either secured or unsecured, as well as the encryption type (i.e., SSL or WTLS);

the key ID field provides key identifications to use for the secured connection;

the server IP field provides an Internet Protocol address to communicate with servers in the data center;

the network port field provides predetermined known port numbers to receive secured or unsecured data from a public network;

the server port field provides a well known predetermined port to communicate plain data to the servers in the data center;

the cipher suites field contains an indication of security strength used for the secured and unsecured connections;

the redirect field provides an option to redirect an access device to security upgrade resources in the event the device does not support the used security features;

the client authentication field determines whether or not client authentication using digital certificates is requested;

the digital signature field determines whether or not client authentication using digital signatures is requested.

The configuration of a security system can be done through either GUI (Graphical User Interface) or CLI (Common Language Interface). For example, client certificates and server certificates can be obtained from a CLI from security vendors. The refresh times for CRL can be set through CLI. The CRL list can be updated from a LDAP server through HTTP (Hypertext Transfer Protocol), FTP (File Transfer Protocol) or LDAP requests. The short-lived server certificates are also automatically updated from the CA repository depending on the user defined interval. The redirection parameter is used for redirecting the client to a URL with the required security related information if the client does not support the needed security functionality on the client side.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while the PKI/WPKI and SSL/WTLS protocols have been described herein, it should be understood by one of ordinary skill in the art that these protocols are described for illustration only, and are not to be construed as limitations on the invention. As such, other protocols may be utilized.

What is claimed is:

1. An apparatus comprising:
a network interface to receive Secure Sockets Layer (SSL) data on a first port from a wired device through a public network and Wireless Transport Layer Security (WTLS) data on a second port from a wireless device through a public network;
Wherein the first port has a number 443 and the second port has a number selected from 9208 through 9282;
Public Key Infrastructure (PKI) logic to establish a secure connection with the wired device;
Wireless Public Key Infrastructure (WPKI) logic to establish a secure connection with the wireless device;
SSL logic to convert the SSL data to another format;
WTLS logic to convert the WTLS data to another format; and
a second interface to provide the data converted from the SSL and WTLS formats to a server over a private network.

2. The apparatus of claim 1, wherein the apparatus is to reside in a data center between the public network and the data center server.

3. The apparatus of claim 1, wherein the other format is a plain data format, and wherein the PKI logic, the WPKI logic, the SSL logic, and the WTLS logic are all included within a single device.

* * * * *